(12) United States Patent
Suitsu

(10) Patent No.: US 6,820,288 B2
(45) Date of Patent: Nov. 23, 2004

(54) PORTABLE TOILET

(75) Inventor: Shingo Suitsu, Kawasaki (JP)

(73) Assignee: Fein Corporation, Kanagawa-ken (JP)

( * ) Notice: Subject to any disclaimer, the term of this patent is extended or adjusted under 35 U.S.C. 154(b) by 0 days.

(21) Appl. No.: 10/227,305

(22) Filed: Aug. 26, 2002

(65) Prior Publication Data

US 2004/0034913 A1 Feb. 26, 2004

(51) Int. Cl.[7] .............................................. A47K 11/04
(52) U.S. Cl. ........................ 4/483; 4/460; 4/479; 4/484
(58) Field of Search ............................ 4/452, 460, 479, 4/480, 483, 484, 485, 449, 456, 457, 469, 476

(56) References Cited

U.S. PATENT DOCUMENTS

| | | | | |
|---|---|---|---|---|
| 392,182 A | * | 11/1888 | Carter ............................ | 4/483 |
| 2,801,426 A | * | 8/1957 | La Gorce et al. ............... | 4/484 |
| 3,495,278 A | * | 2/1970 | Peters ............................ | 4/484 |
| 4,606,080 A | * | 8/1986 | Clementino .................... | 4/460 |
| 4,837,868 A | * | 6/1989 | Allen ............................. | 4/480 |
| 5,170,516 A | * | 12/1992 | Davison ........................ | 4/484 |
| D383,199 S | * | 9/1997 | Nodo ........................ | D23/299 |
| 5,950,251 A | * | 9/1999 | Cost et al. ..................... | 4/483 |

\* cited by examiner

Primary Examiner—Henry Bennett
Assistant Examiner—Amanda Flynn
(74) Attorney, Agent, or Firm—Reed Smith LLP; Stanley P. Fisher, Esq.; Juan Carlos A. Marquez, Esq.

(57) ABSTRACT

A portable toilet, suitable in disasters, leisure activities, and others. The portable toilet includes a pail and a seat structure detachably mounted at the opening of the pail. The seat structure has a base, a seat and a cover. A metal ring band is detachably mounted to the pail with a fastener. Parallel metal stays protrude horizontally from the outer surface of the metal band ring. A hand grip is formed of an U-shaped metal pipe. The lower ends of each U-shaped metal pipe are securely fixed to ends of each parallel metal stay. The metal band ring of the hand grip is tightly banded around the pail with the fastener. The pipes stand upward from the right and left sides of the pail. When the user sits down on the seat or gets off therefrom, the user is supported with the hands holding the hand grips.

2 Claims, 25 Drawing Sheets

PORTABLE TOILET

BACKGROUND OF THE INVENTION

1. Field of the Invention

The present invention relates to a portable toilet, particularly, to a portable toilet suitable for disasters, leisure activities, and others. Moreover, the present invention relates to a hand grip detachably mounted to the portable toilet and to a toilet paper holder detachably fitted to the hand grip.

2. Description of the Prior Art

Pails are, for example, 18 to 20 liter steel cans with sealing lids (e.g. JIS Z1620 steel pails), used as containers for conveyance or storage of liquid, solid hazardous materials or non-hazardous materials. Pails are being used as very-reliable, strong, safe containers standardized in a wide range of industries at home and abroad. These pails can be supplied in mass volume. A huge number of used pails exist.

A lesson of, for example, the Hansin earthquake disaster (in Japan) is that toilet facilities are essential, first of all, in emergency and in disaster, together with water to drink, foods, clothes, and others. In disasters, because indoor flush toilets become impotent, alternative toilets have to be prepared temporarily.

Conventionally, portable toilets, where a simple seat formed of a circular plate with a hole is disposed on an oil can or on a plastic bucket, have been provided. However, such portable toilets are too humble and, particularly, wobble the use by women. The toilets comfortably accepted by the majority have not been yet provided.

Even in disasters, because going to the rest room relates to human dignity, it is desirable that toilets have good external appearance and easy of use. Booth-type mobile lavatories, for example, installed at construction work sites may be adapted as that toilet but are bulky. Such portable toilets that can be used personally, at a shelter, or at home for several days in disasters have not been ever provided.

Moreover, in leisure activities such as camping, driving, angling and the like, such portable toilets that can be easily carried and conveniently used at toilet-less places and can adapt to bring back and treat human wastes without the disposal of them at the spot have not been ever provided.

Moreover, in the use of the portable toilet, there have been strong demands for body supporting members conveniently used, particularly, when an aged person, patient, or infant sits down on or gets off from the seat.

SUMMARY OF THE INVENTION

The present invention is made to solve the above-mentioned problems.

An object of the invention is to provide a portable toilet suitably used in emergencies and disasters.

Another object of the present invention is to provide a hand grip detachably mounted to the portable toilet.

Further another object of the present invention is to provide a toilet paper holder fitted detachably and vertical-slidably to the hand grip.

In the portable toilet of the present invention, the external structure of a seat structure is intentionally designed to obtain an external appearance and good operability more close to those of the conventional toilet. A standard pail (e.g. a JIS Z1620 steel pail) that can be supplied inexpensively and in mass volume and has a good sealing performance is used as a container receiving and reserving wastes. Moreover, the portable toilet includes a simple hand grip which can be easily mounted detachably to the pail and which can support strongly and stably even under the weight of a user and which is installable in a small space, and a toilet paper holder attachable to the hand grip.

In an aspect of the present invention, a portable toilet comprises a seat structure. The seat structure is disposed on a pail in which a waste bag is set and is detachably attached in the vicinity of a flange at the opening of the pail and by means of screws provided on the front side of the seat, the pail in which a waste bag is set. The seat structure includes a base, a seat, and a cover. The base is a circular or oval plate having a center hole. The base has an inner hanging portion extending downward from edges of the hole, an outer hanging portion extending downward from outer periphery, detachable means, and a bracket bearing protruding at the upper end of the base and rotatably attaching a bracket of the seat and a bracket of the cover on a shaft. The seat is a circular or oval plate having a center hole and a bracket. The seat is disposed on the base, the bracket protruding at the rear end, the bracket being rotatably attached to a bracket bearing of the base by means of a shaft to open and close the seat. The cover is a circular or oval plate which has a center recess to cover the upper surface of the seat. The cover has a rear end from which a bracket protrudes. The bracket is rotatably attached to a bracket bearing of the base by means of a shaft to open and close the cover.

Moreover, in another aspect of the present invention, a seat structure for a portable toilet comprises a seat structure. The seat structure includes a base, a seat and a cover. The base is a circular or oval plate having a center hole. The base has an inner hanging portion extending downward from edges of the hole, an outer hanging portion extending downward outer periphery, detachable means, and a bracket bearing protruding at the upper end of the base and rotatably attaching a bracket of the seat and a bracket of the cover on a shaft. The seat is a circular or oval plate having a center hole and a bracket. The seat is disposed on the base, the bracket protruding at the rear end, the bracket being rotatably attached to a bracket bearing of the base by means of a shaft to open and close the seat. The cover is a circular or oval plate which has a center recess to cover the upper surface of the seat. The cover has a rear end from which a bracket protrudes. The bracket is rotatably attached to a bracket bearing of the base by means of a shaft to open and close the cover. The seat is disposed on a pail in which a waste bag is set. The inner hanging portion of the base is positioned in the pail. The seat is detachably mounted to the pail by means of detachable means.

Further another aspect of the present invention relates to a hand grip for a portable toilet. The portable toilet includes a pail and a seat structure detachably mounted at an opening of the pail. The seat structure has a base, a seat, and a cover. The hand grip comprises, a metal ring band detachably attached to the pail by means of a fastener; sets of parallel metal stays respectively extending rightward and leftward from the metal ring band; and U-shaped grip-hand pipes each having its lower ends bonded with ends of a set of parallel metal stays. The metal ring band is wound around the pail and is securely fixed by means of a fastener. The U-shaped grid-hand pipes stands upward respectively on the right and left sides of the pail. When a user sits down or gets off on/from the seat, the user grips the grip-hand pipes with both hands to support the user's body.

Still further another aspect of the present invention relates to a toilet paper holder for a portable toilet using a pail. The toilet paper holder comprises a back plate; right and left side plates; a shaft spanned between the right and left side plates, the shaft through which a toilet roll is inserted; a paper cover for covering an upper surface of the toilet roll; and an attachment mounted to the back plate of the holder so as to be fitted detachably and vertical slidably to a right or left parallel hand-grip pipes of the portable toilet. The attachment is a rectangular metal plate fixed to the back plate. The rectangular metal plate has end lips semi-circularly bent. The end lips have a diameter corresponding to the diameter of a hand-grip pip. The end lips are fitted detachably and vertical-slidably to the hand-grip parallel pipes.

BRIEF DESCRIPTION OF THE DRAWINGS

This and other objects, features, and advantages of the present invention will become more apparent upon a reading of the following detailed description and drawings, in which.

DETAILED DESCRIPTION OF THE PREFERRED EMBODIMENT

Figure 1:
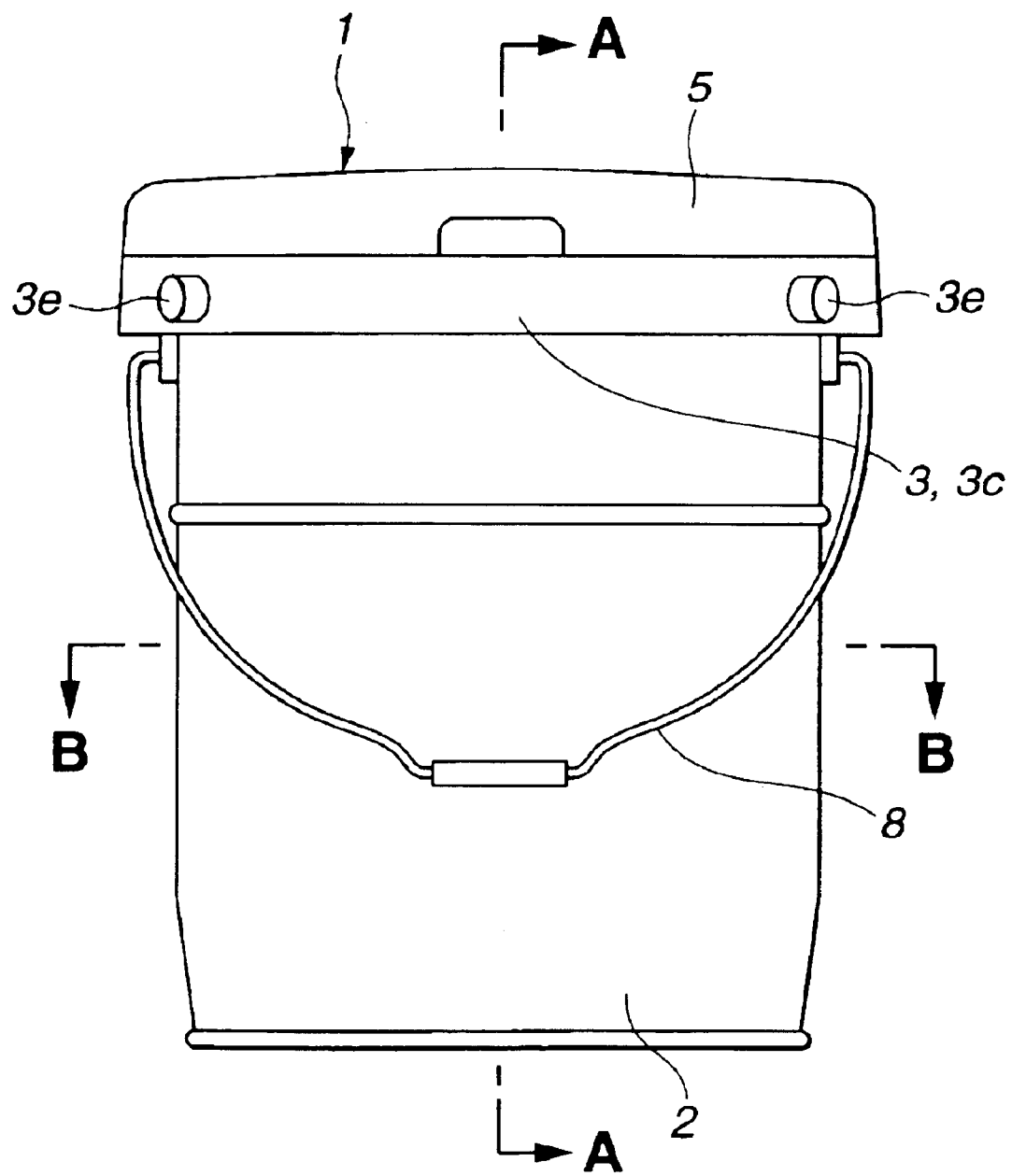
FIG. 1 is a front view schematically illustrating a portable toilet according to an embodiment of the present invention.
Figure 2:
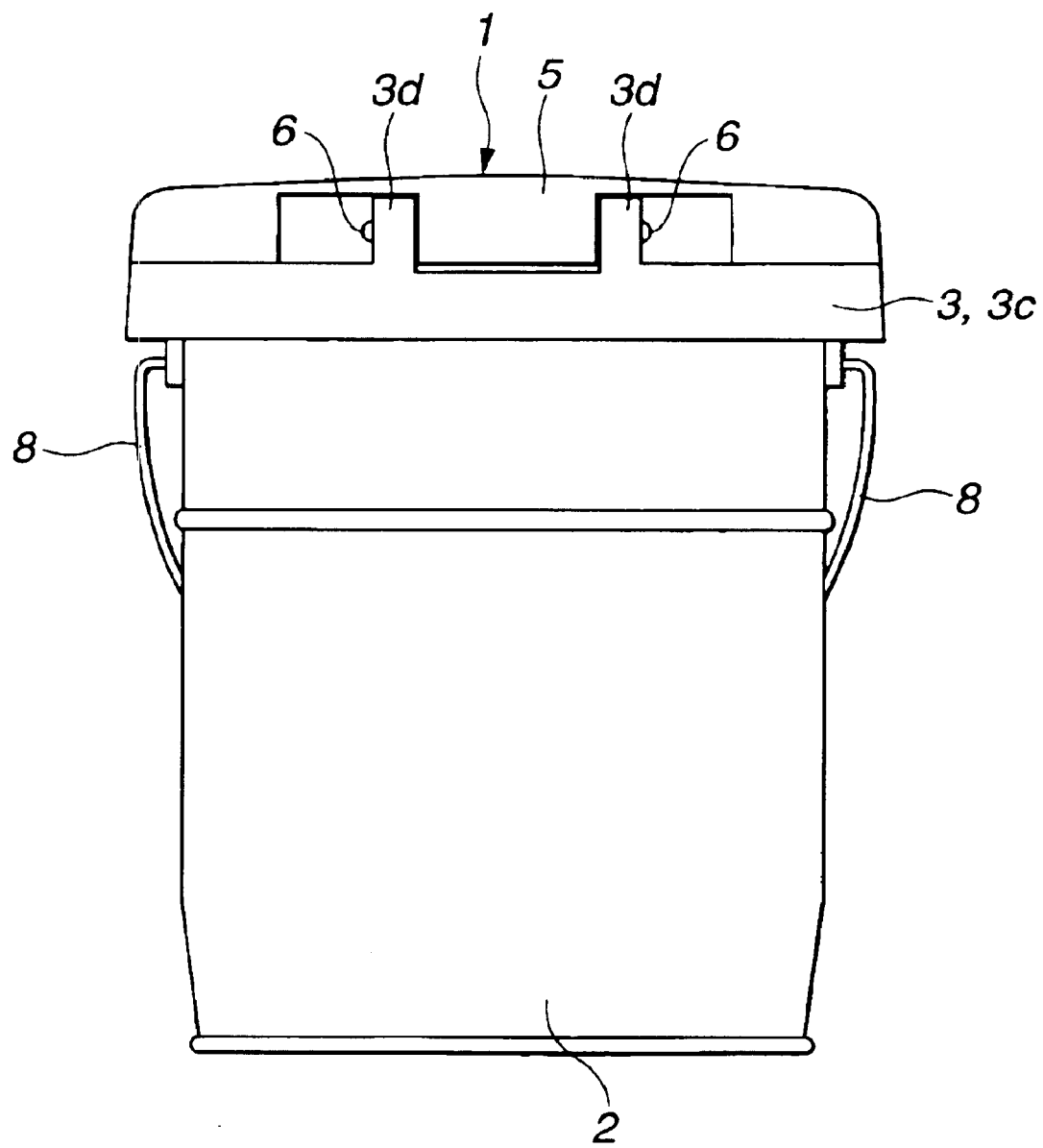
FIG. 2 is a back view illustrating a portable toilet according to an embodiment of the present invention.
Figure 3:
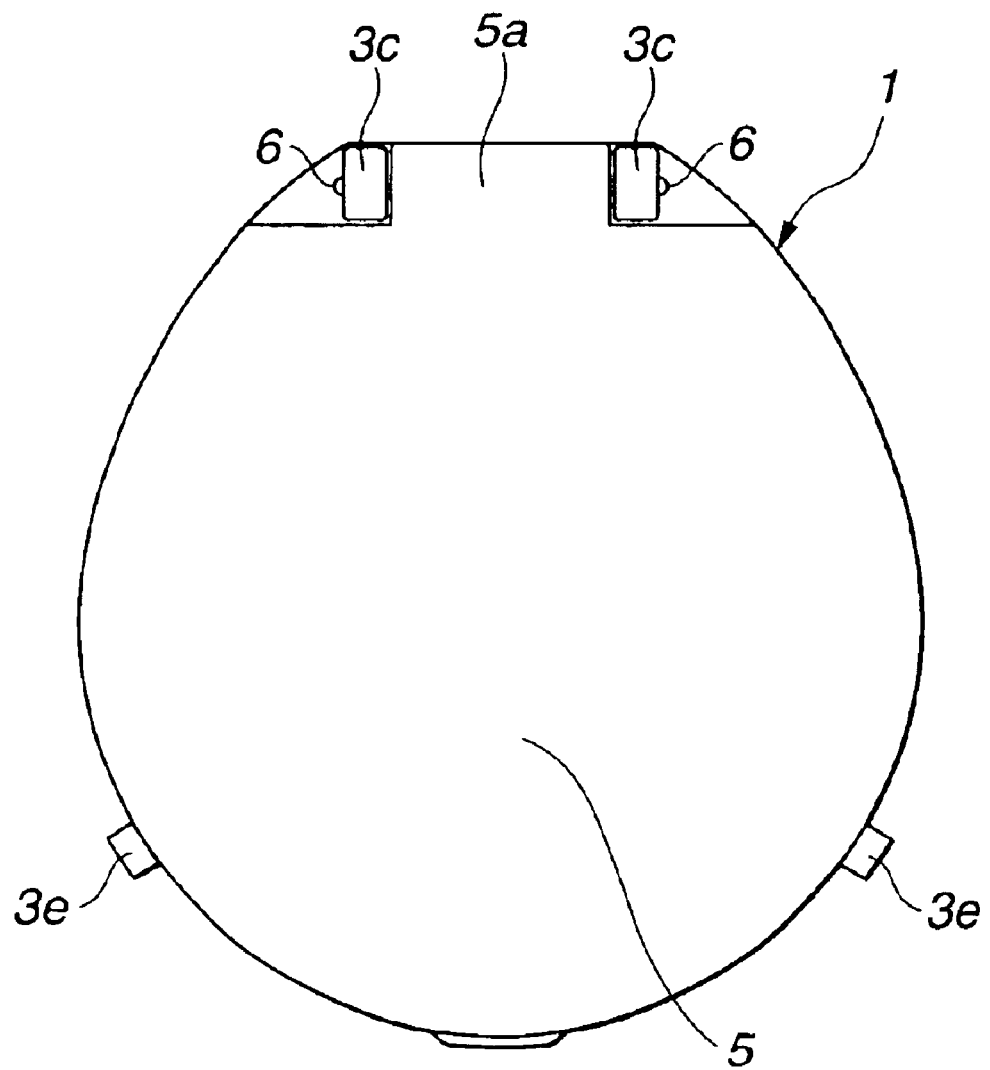
FIG. 3 is a plan view illustrating a portable toilet according to an embodiment of the present invention.
Figure 4:
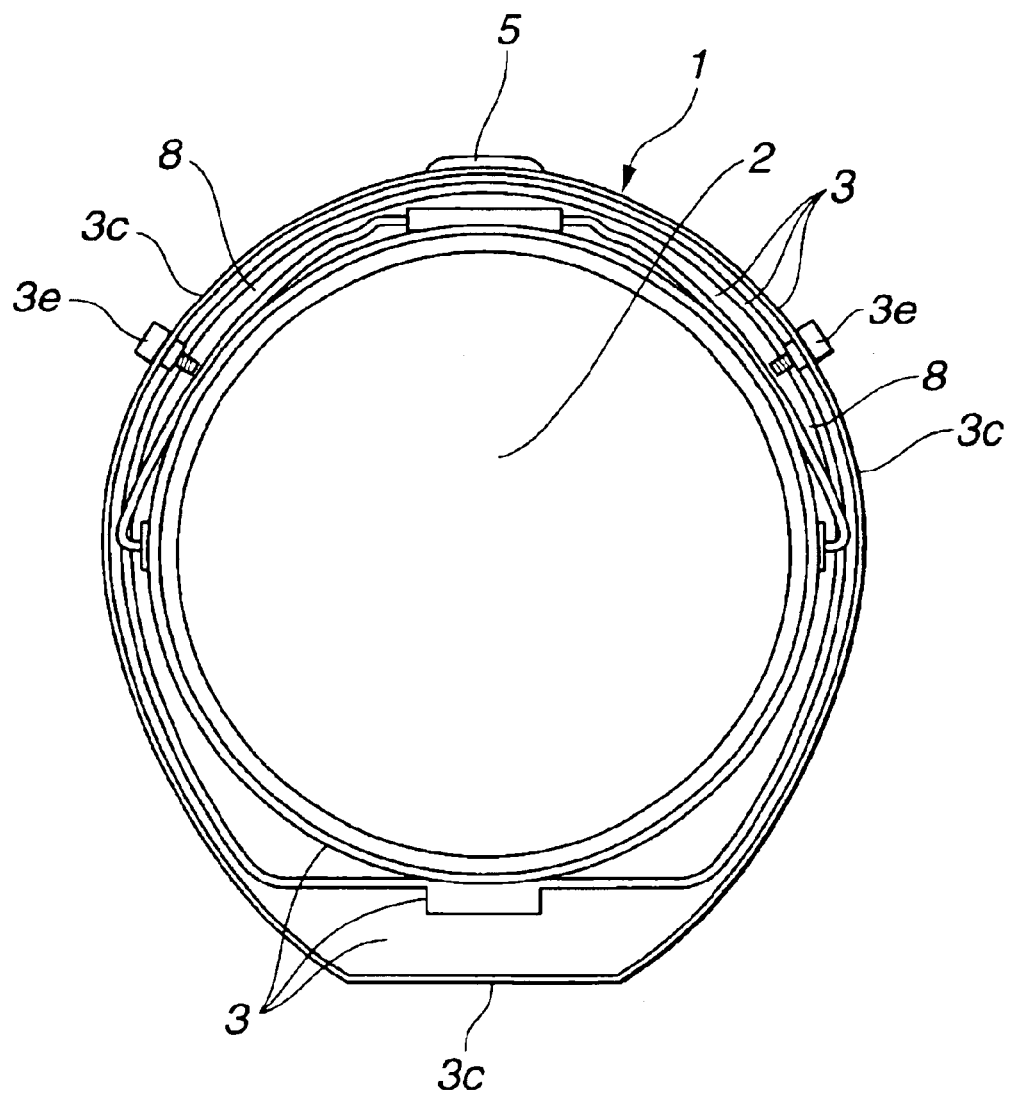
FIG. 4 is a bottom view illustrating a portable toilet according to an embodiment of the present invention.
Figure 5:
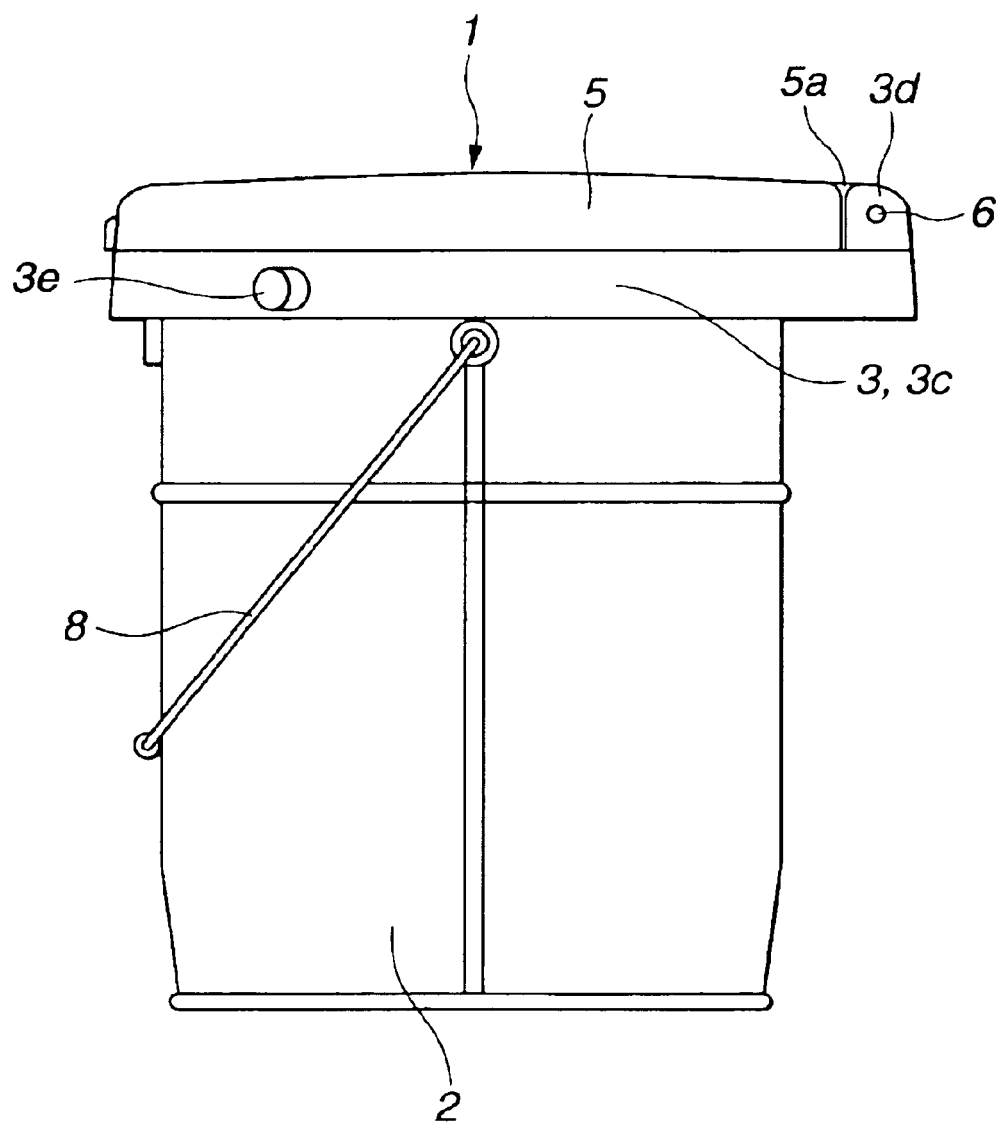
FIG. 5 is a right side view illustrating a portable toilet according to an embodiment of the present invention.
Figure 6:
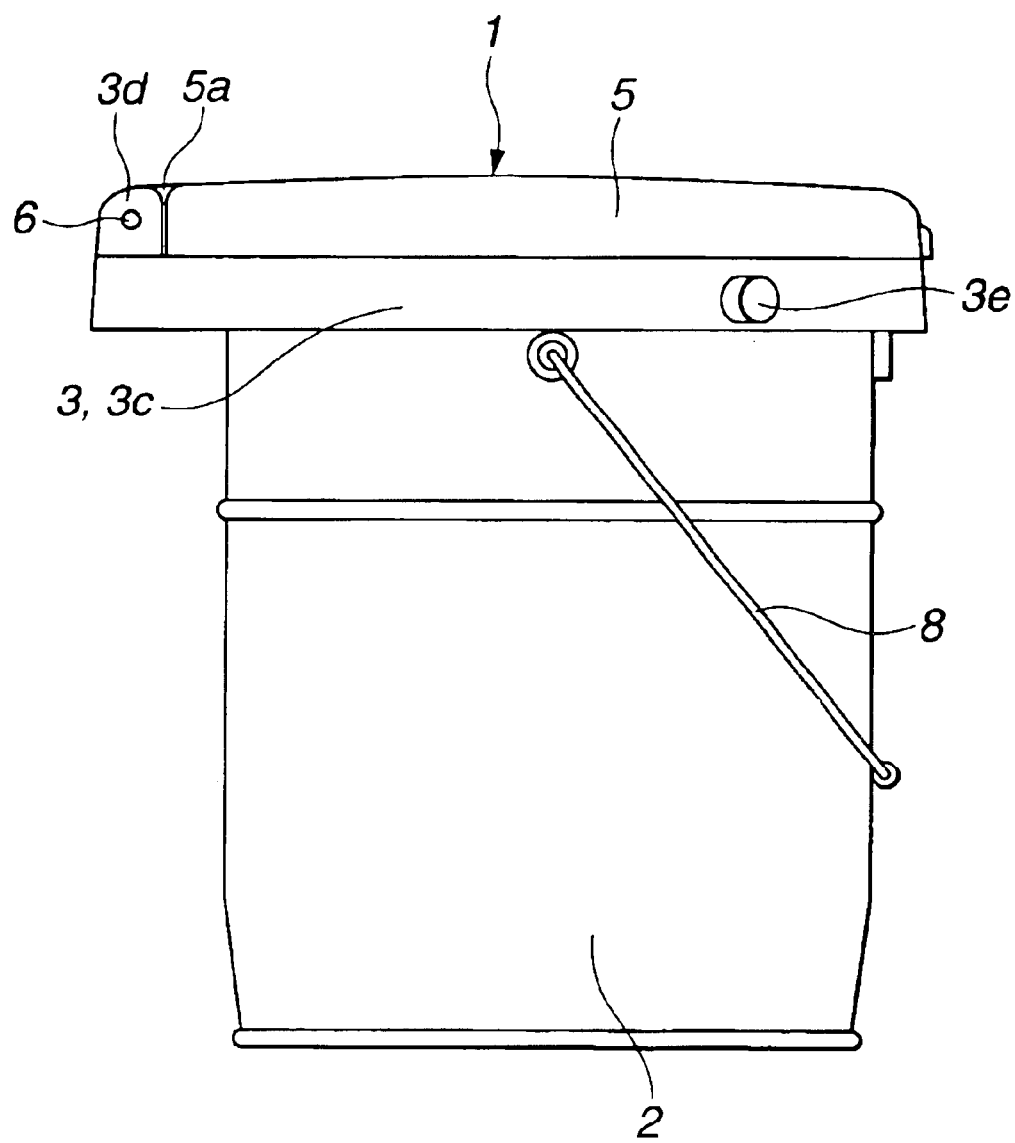
FIG. 6 is a left side view illustrating a portable toilet according to an embodiment of the present invention.
Figure 7:
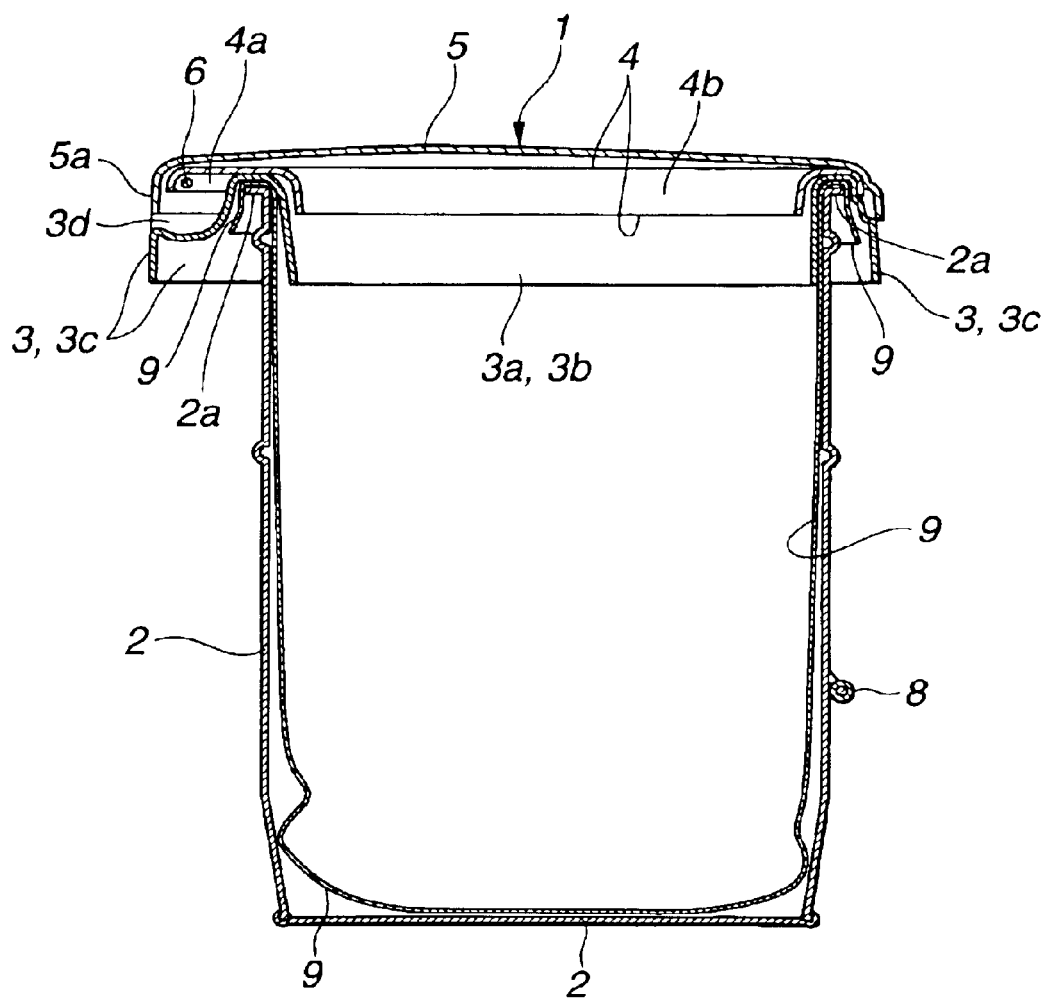
FIG. 7 is a fragmentary view illustrating a portable toilet taken along the line A—A of FIG. 1.
Figure 8:
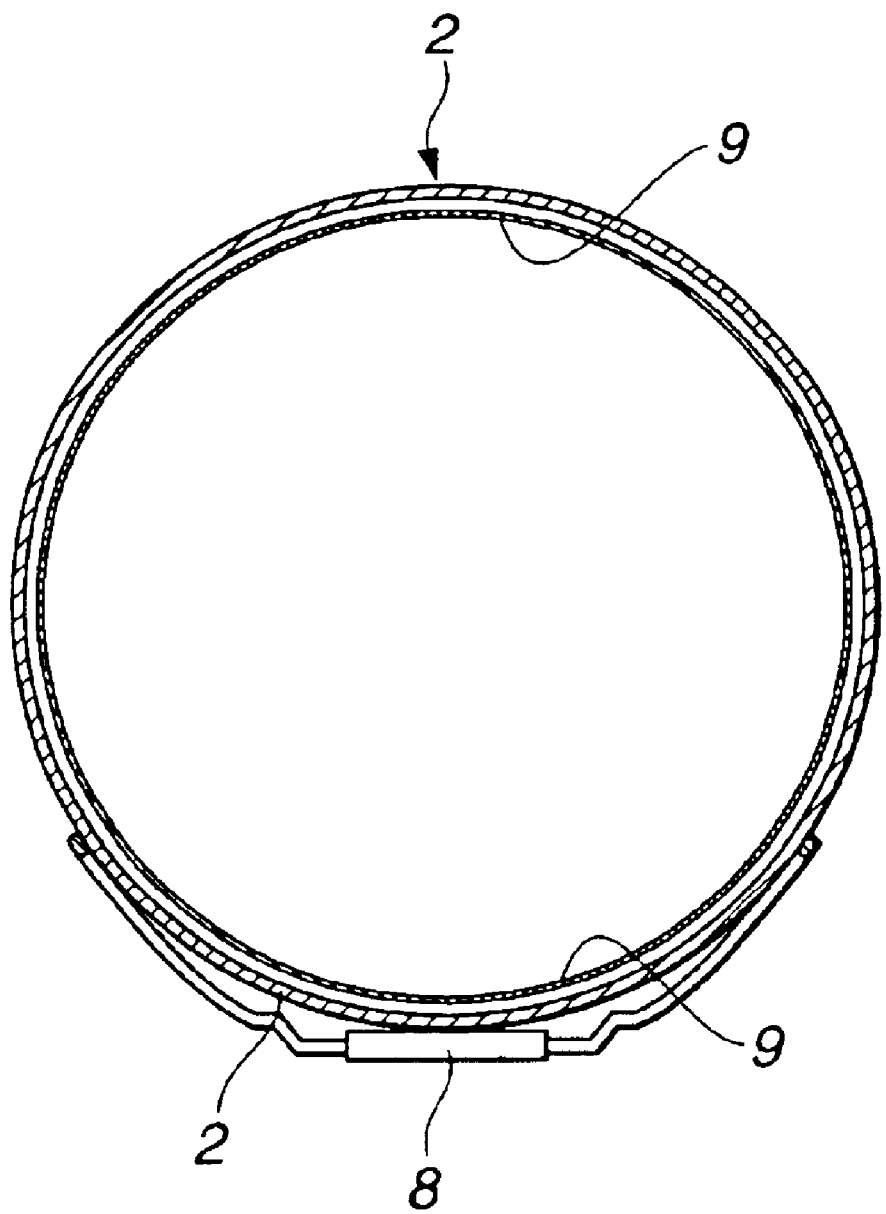
FIG. 8 is a fragmentary view illustrating a portable toilet taken along the line B—B of FIG. 1.
Figure 9:
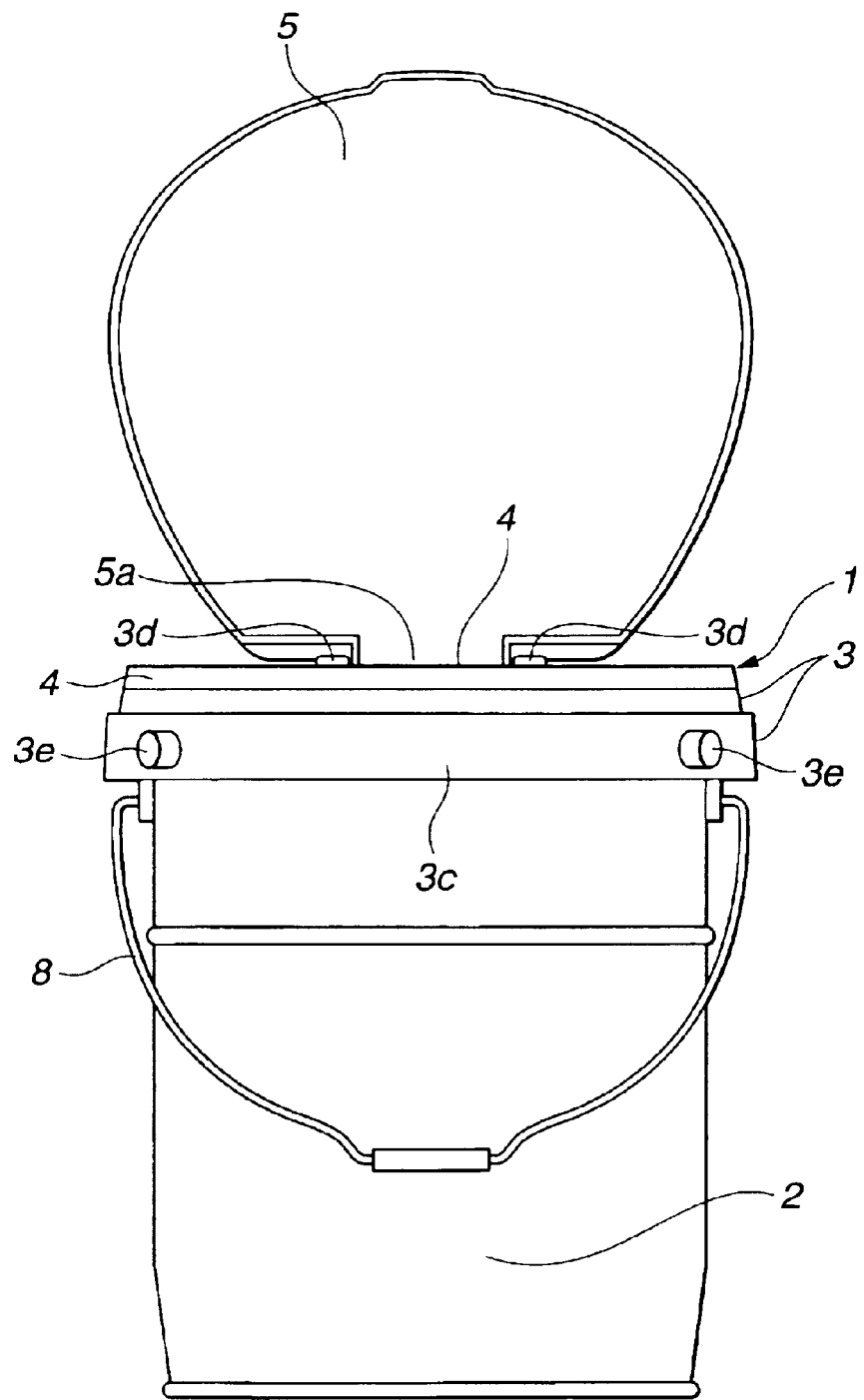
FIG. 9 is a front view illustrating a portable toilet, with a seat cover opened.
Figure 10:
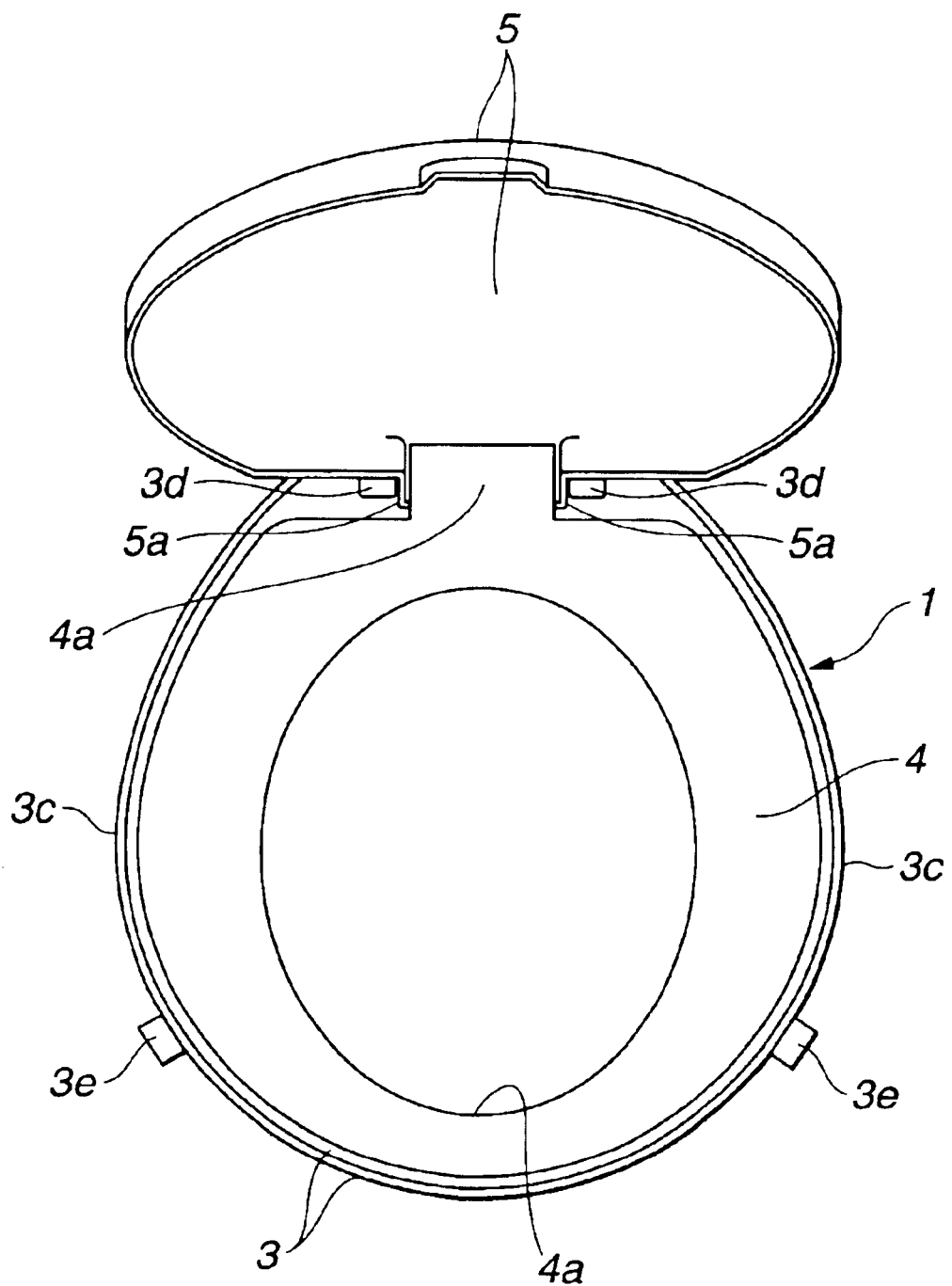
FIG. 10 is a plan view illustrating a portable toilet, with a seat cover opened.
Figure 11:
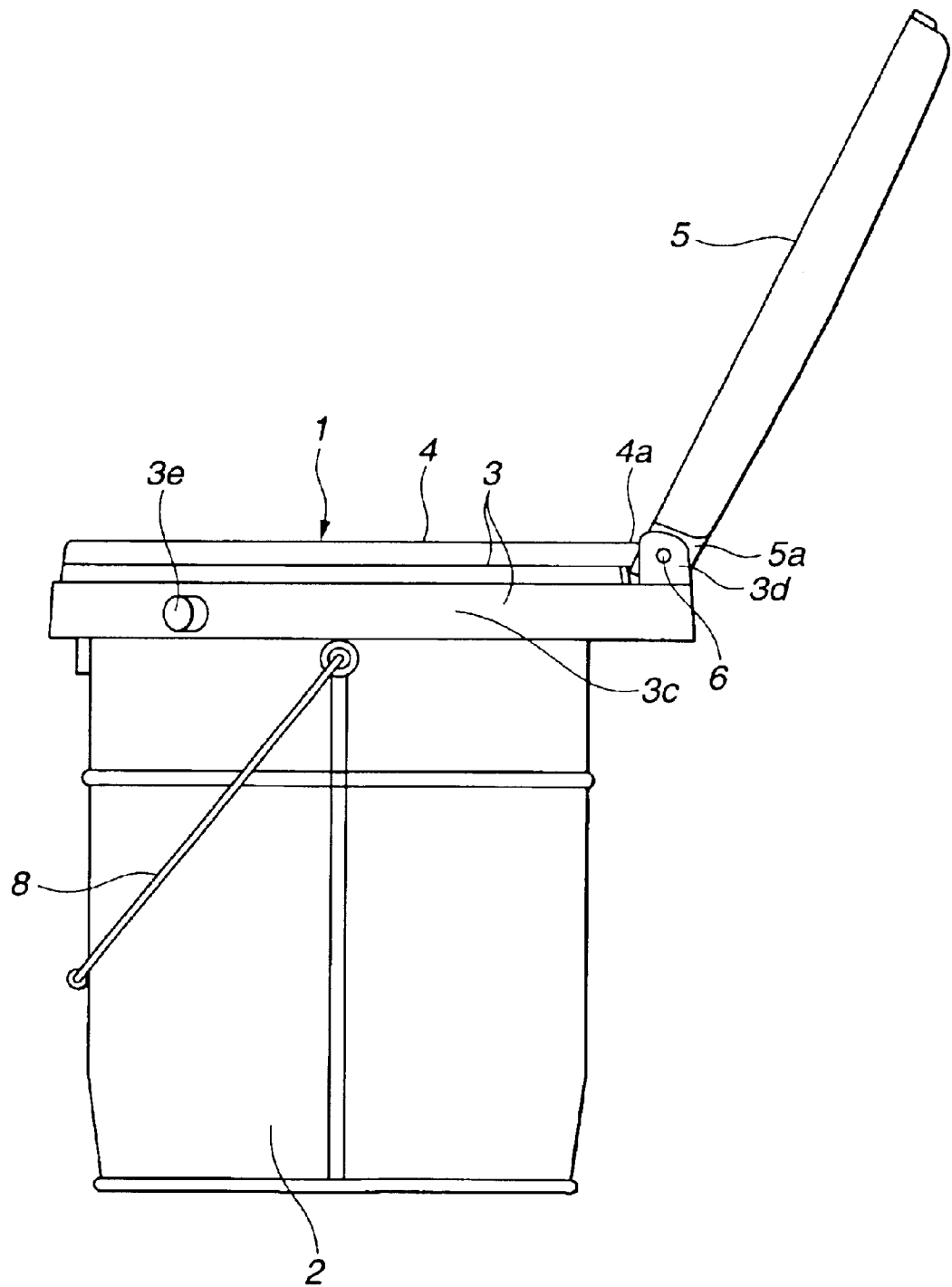
FIG. 11 is a right side view illustrating a portable toilet, with a seat cover opened.
Figure 12:
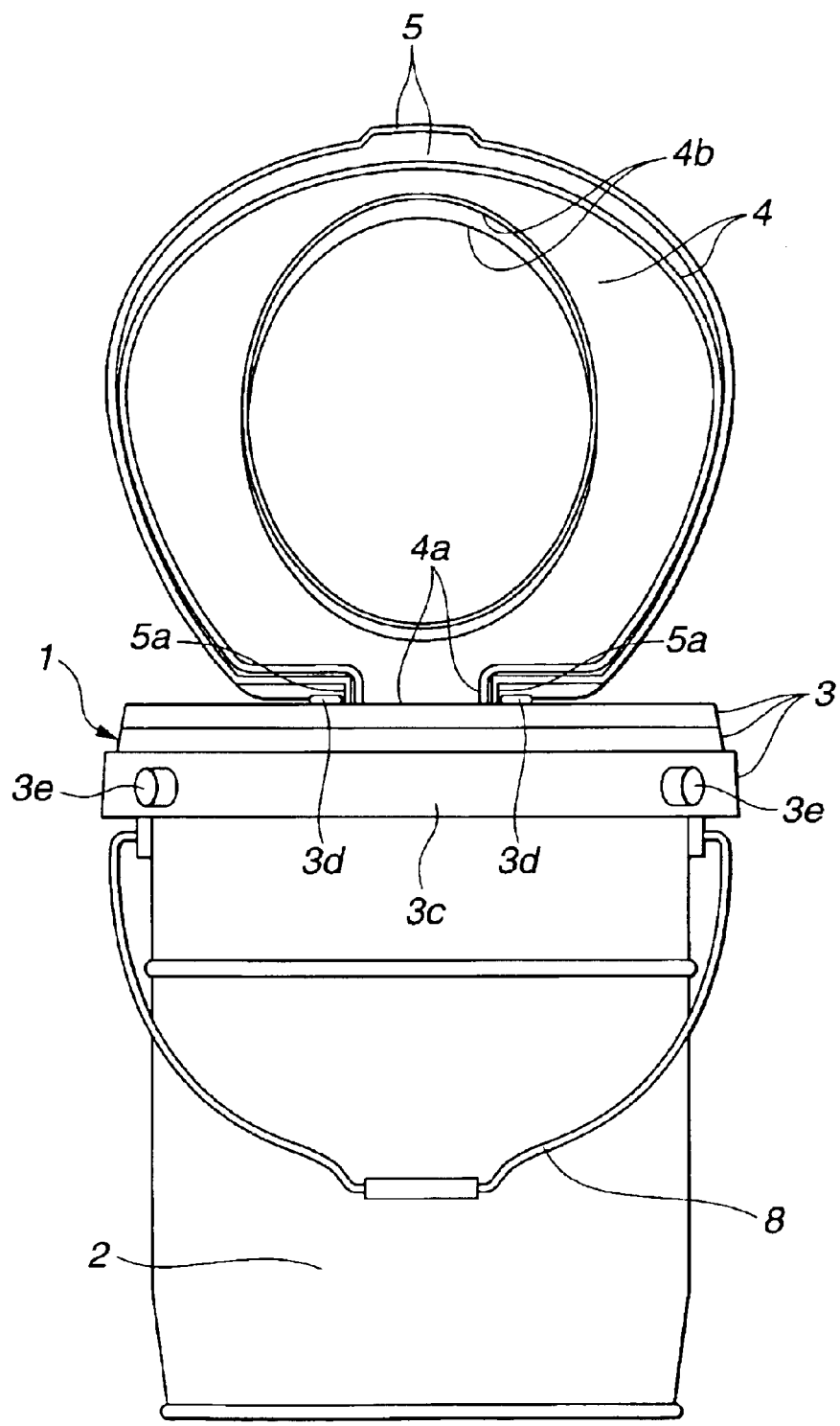
FIG. 12 is a front view illustrating a portable toilet, with a seat cover and a seat opened.
Figure 13:
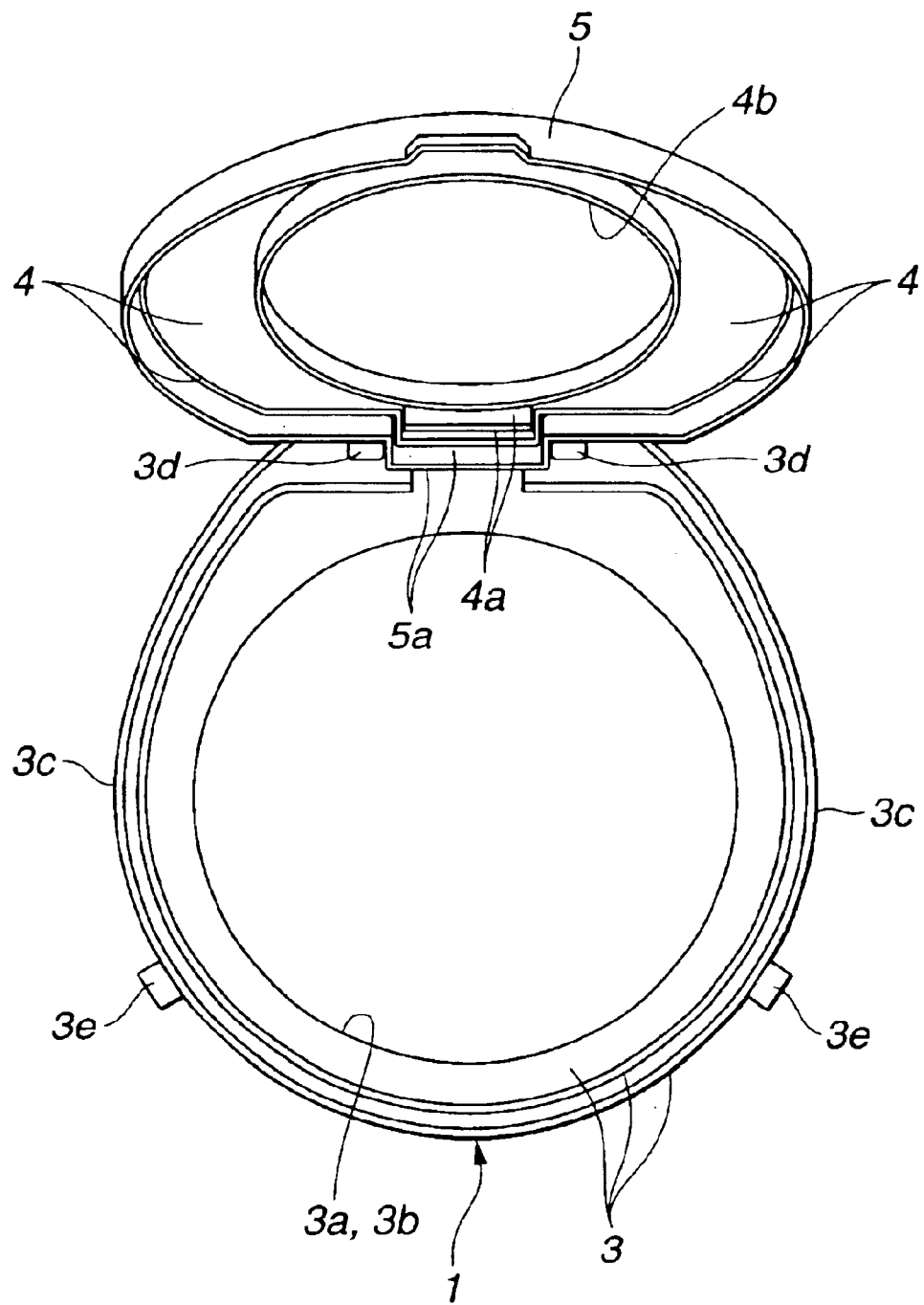
FIG. 13 is a plan view illustrating a portable toilet, with a seat cover and a seat opened.
Figure 14:
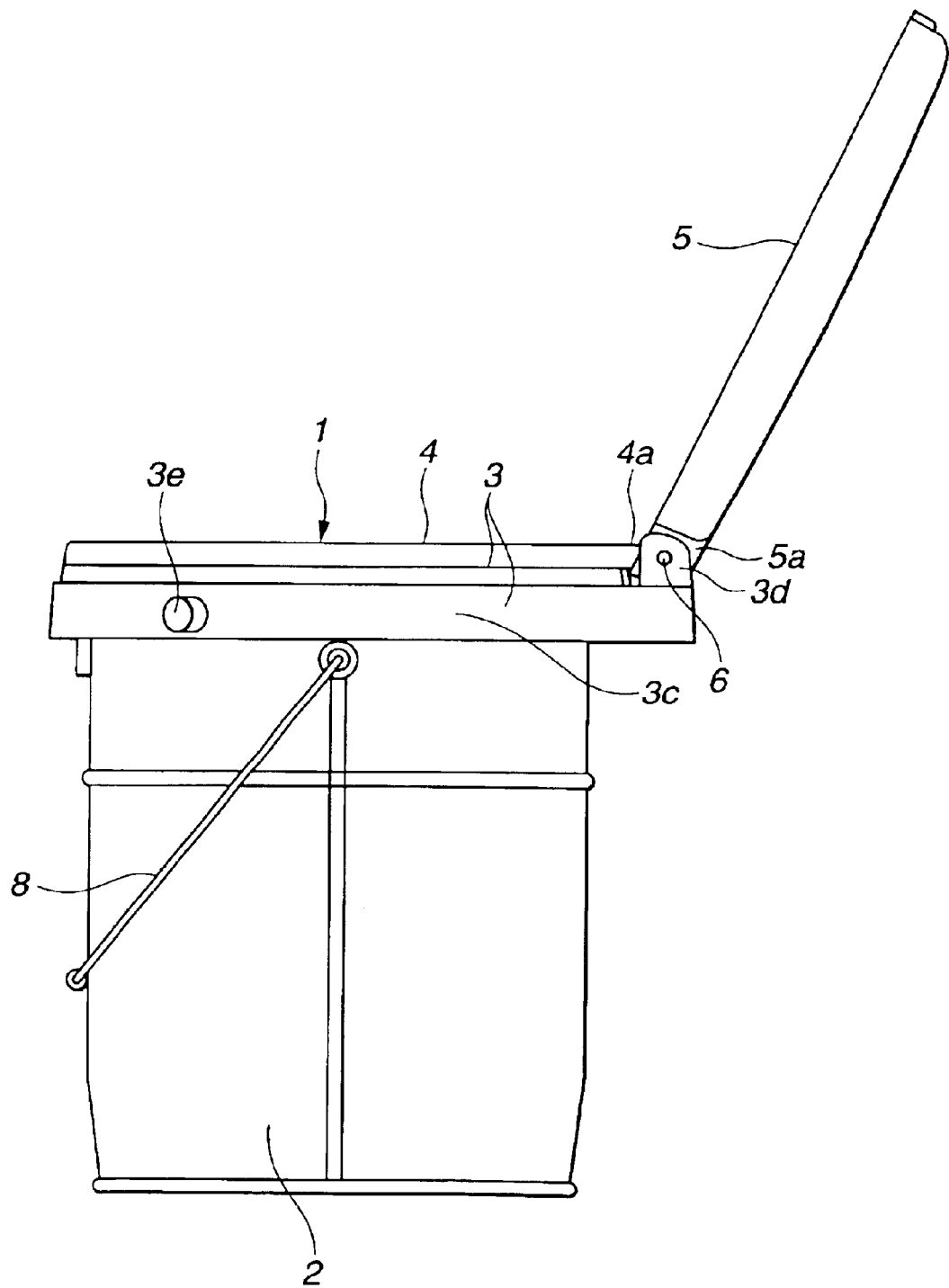
FIG. 14 is a right side view illustrating a portable toilet, with a seat cover and a seat opened, according to the second embodiment.

A portable toilet according to a first embodiment of the present invention will be described below by referring to FIGS. 1 to 22.

In the portable toilet suitable for uses in disasters and in leisure activities, a seat structure 1 is placed on a pail 2. The seat structure 1 includes a base 3, a seat 4 and a cover 5. A sealing lid 2b is removed and a waste bag 9 is set in the pail 9. The seat structure 1 is detachably mounted in the vicinity of the flange 2a at the opening of the pail 2, using screws 3e provided on the front side of the seat structure 4.

The base 3 is formed of a circular or oval plate of a diameter larger than the outer diameter of the pail 2. The plate has a center hole 3a of a diameter corresponding to the inner diameter of the pail 2. The plate has a inner hanging portion 3b extending downward from the edges of the hole and an outer hanging portion 3c extending downward from the outer fringe. The base 3 has attachments. The attachment is, for example, screws 3e provided on the front side of the outer hanging portion 3c or magnets 3f mounted at positions of the inner surface of the base 3, corresponding to the opening of the pail 2. The bracket bearings 3d are provided on the upper rear end of the base 3 to rotatably attach the bracket 4a of the seat 4 and the bracket 5a of the cover 5 by means of the axis 6.

The (toilet) seat 4 is formed of a circular or oval plate having a center circular or oval hole 4b of a diameter smaller than the hole 3a of the base 3. The seat 4 is placed on the base 3 so as to align the hole 4b with the hole 3a of the base 3. The bracket 4a protruded from the rear end of the seat 4 is rotatably attached to the bracket bearing 3d of the base 3 by means of the shaft 6, thus being arbitrarily open and closed.

The cover 5 is formed of a circular or oval plate of which the middle is recessed. The cover 5 seals the upper surface of the seat 4. The bracket 5a protruded from the rear end of the cover 5 is rotatably attached to the bracket bearing 3d of the base 3 by means of the shaft 6, thus being arbitrarily opened and closed.

Figure 15:
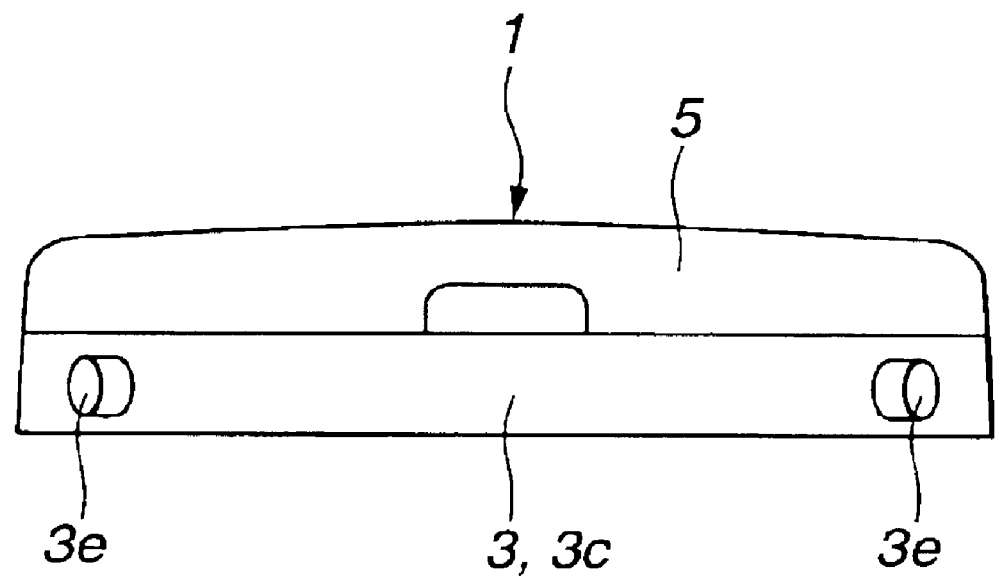
FIG. 15 is a front view of a seat structure removed from a pail.
Figure 16:
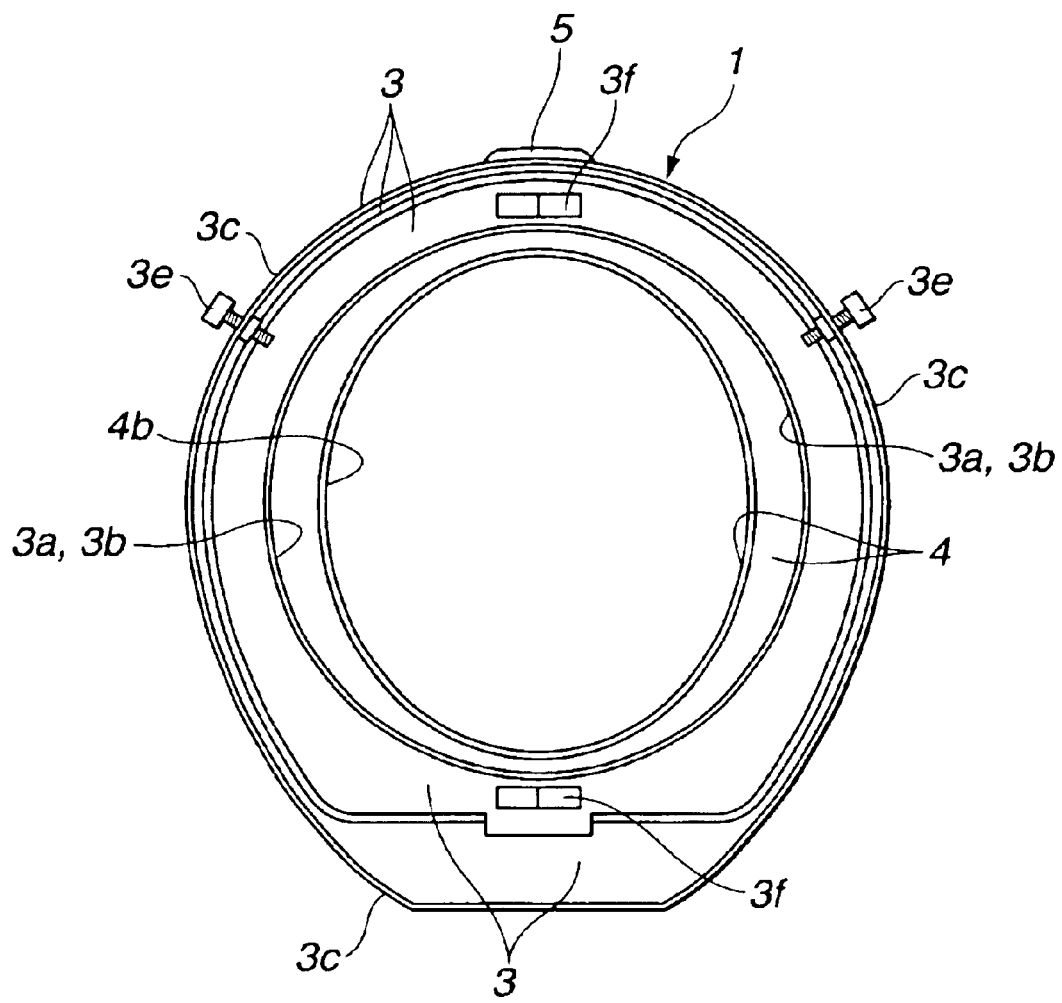
FIG. 16 is a bottom view illustrating of a seat structure removed from a pail.
Figure 17:
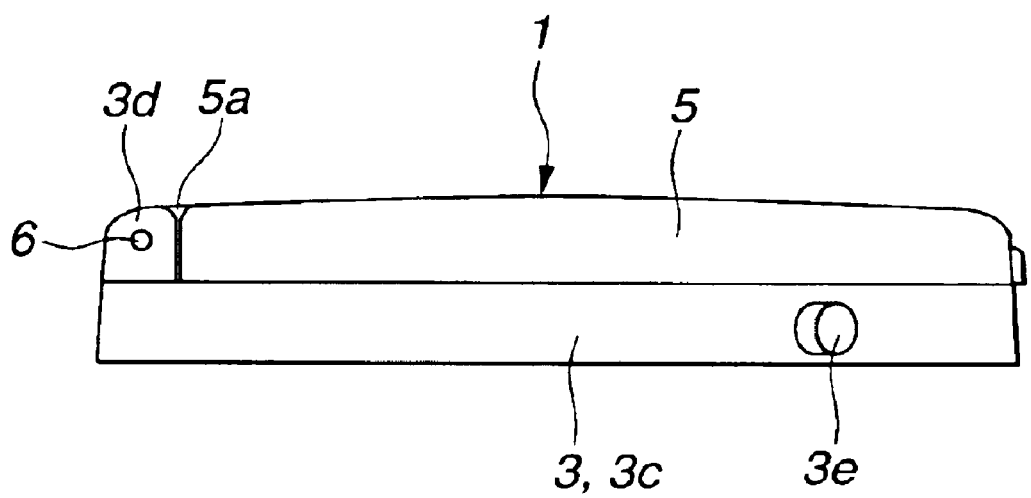
FIG. 17 is a right side view illustrating of a seat structure removed from a pail.
Figure 18:
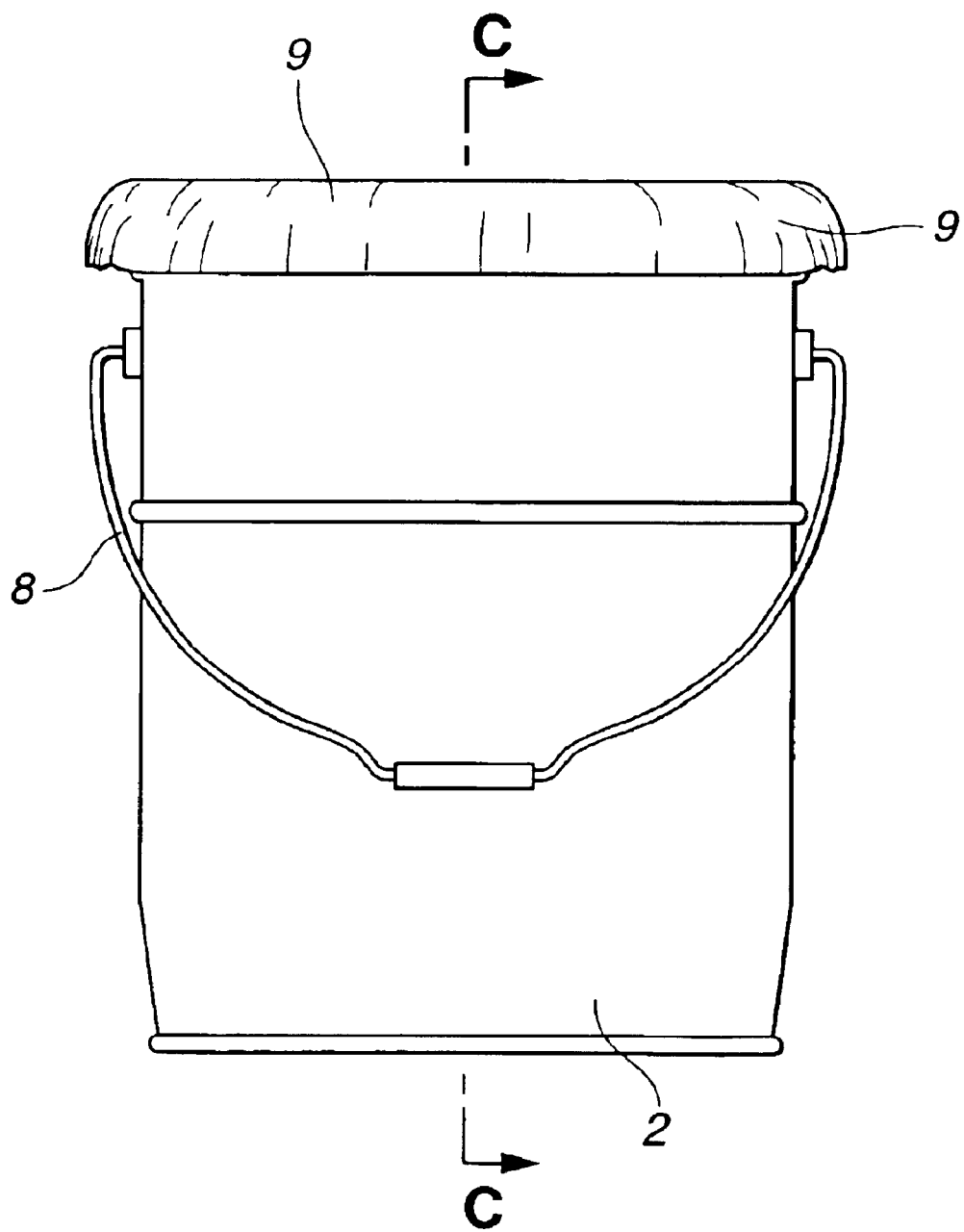
FIG. 18 is a front view of a pail in which a waste bag is set.
Figure 19:
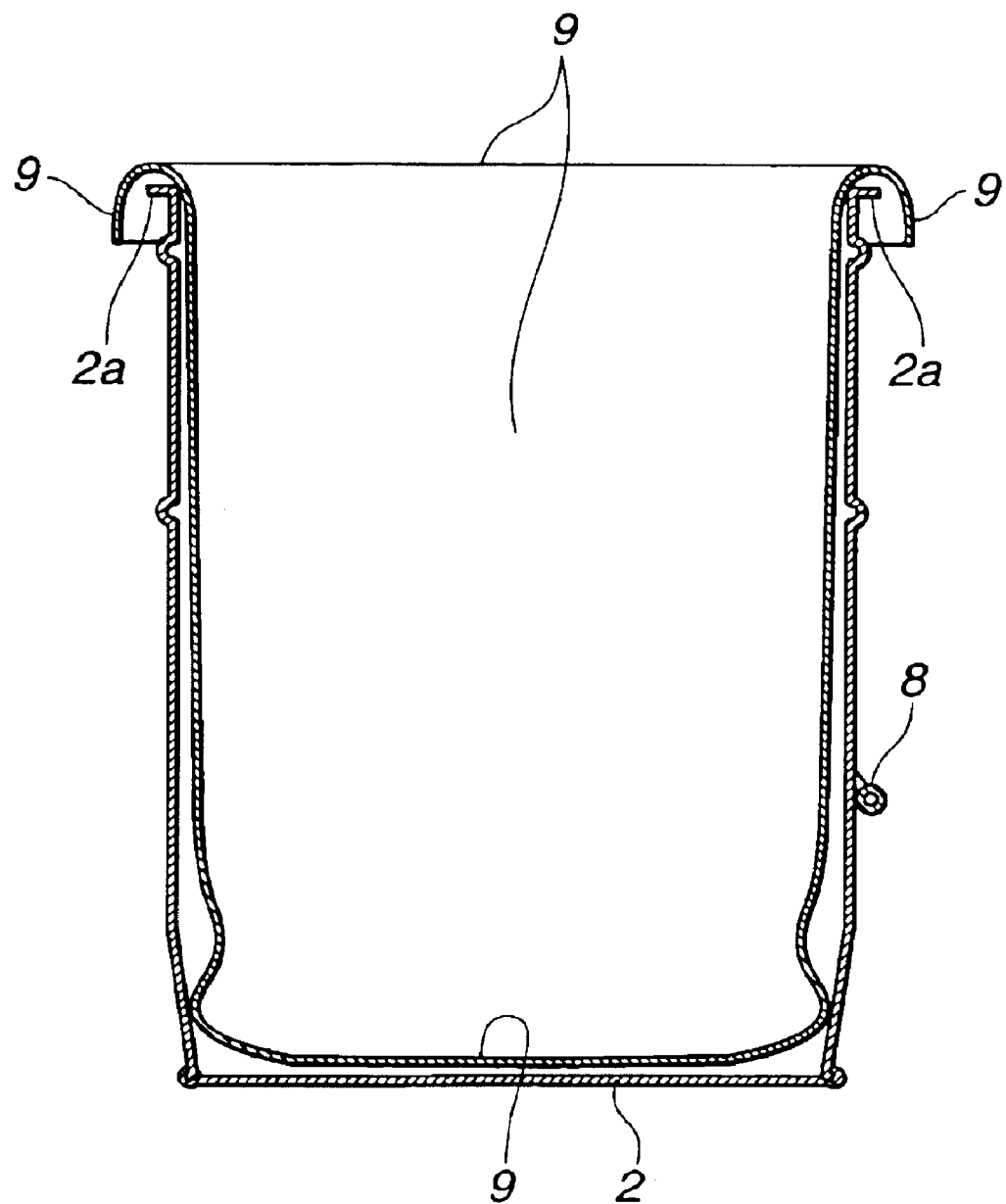
FIG. 19 is a fragmentary view illustrating a portable toilet taken along the line C—C in FIG. 18.
Figure 20:
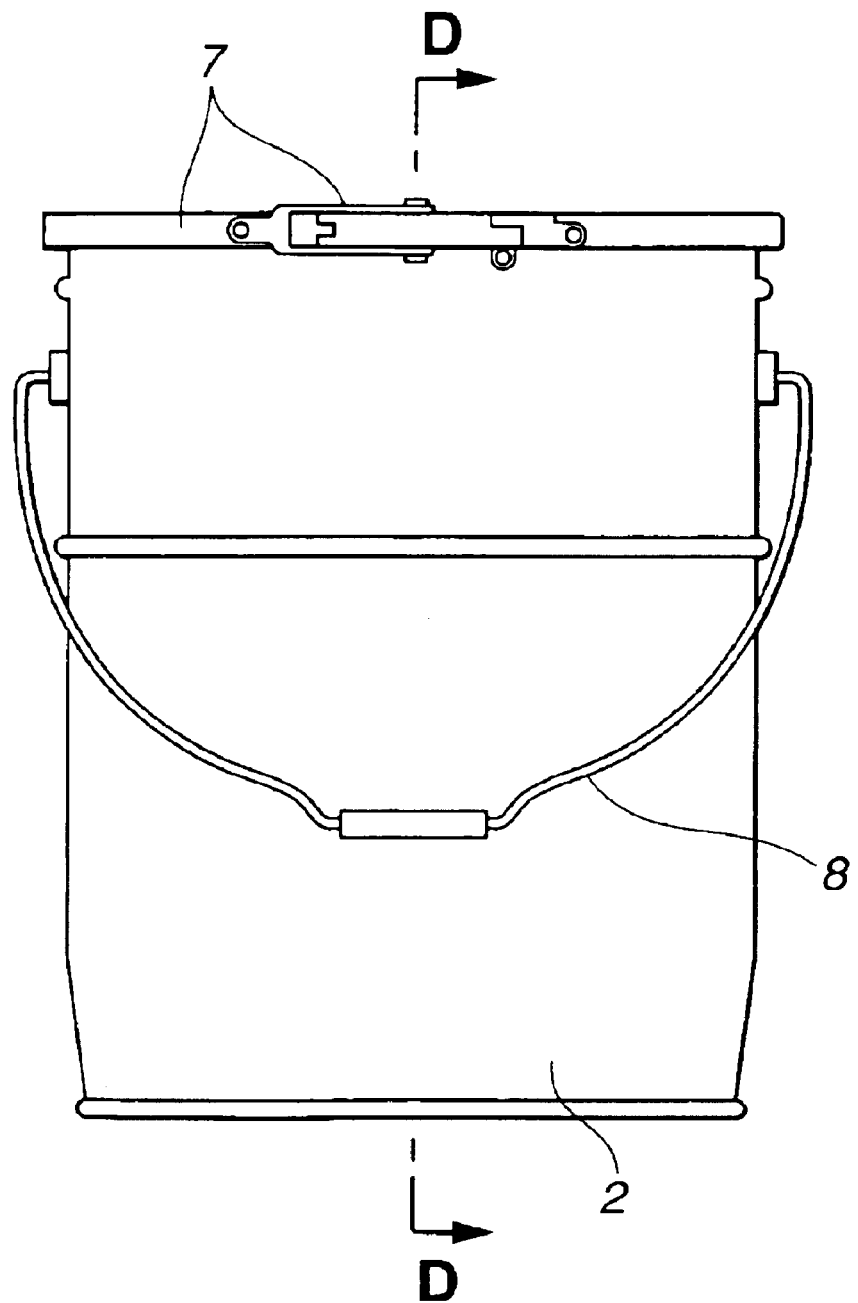
FIG. 20 is a front view illustrating a pail sealed with a lid.
Figure 21:
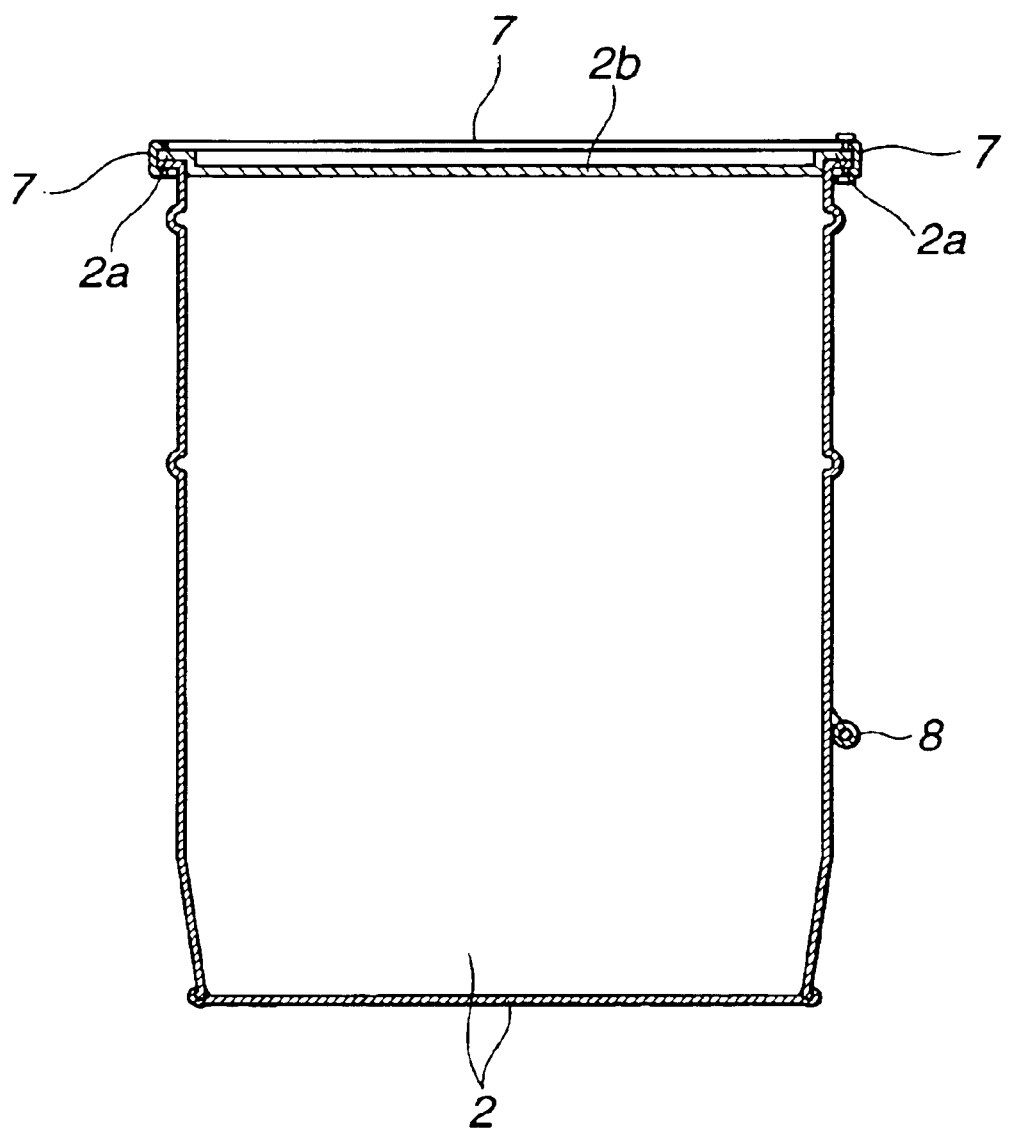
FIG. 21 is a fragmentary view illustrating a portable toilet taken along the line D—D in FIG. 20.

A seat structure for a portable toilet suitable for use in disasters and leisure activities, according to a second embodiment of the present invention, will be explained by referring to FIGS. 15 to 17 (refer to FIGS. 1 to 22)

The seat structure 1 includes a base 3, a (toilet) seat 4 and a cover 5.

The base 3 is formed of a circular or oval plate of a diameter larger than the outer diameter of the pail 2. The plate has a center hole 3a of a diameter corresponding to the inner diameter of the pail 2. The plate has an inner hanging portion 3b extending downward from the edges of the hole and an outer hanging portion 3c extending downward from the outer fringe. The base 3 has attachments. The attachment is, for example, screws 3e provided on the front side of the outer hanging portion 3c or magnets 3f mounted at positions of the inner surface of the base 3, corresponding to the opening of the pail 2. The bracket bearings 3d are provided on the upper rear end of the base 3 to rotatably attach the bracket 4a of the seat 4 and the bracket 5a of the cover 5 by means of the axis 6.

The seat 4 is formed of a circular or oval plate having a center circular or oval hole 4b of a diameter smaller than the center hole 3a of the base 3. The seat 4 is placed on the base 3 so as to align the hole 4b with the hole 3a of the base 3. The bracket 4a protruded from the rear end of the seat 4 is rotatably attached to the bracket bearing 3d of the base 3 by means of the shaft 6, thus being arbitrarily opened and closed.

The cover 5 is formed of a circular or oval plate of which the middle is recessed. The cover 5 seals the upper surface of the seat 4. The bracket 5a protruded from the rear end of the cover 5 is rotatably attached to the bracket bearing 3d of the base 3 by means of the shaft 6, thus being arbitrarily opened and closed.

The sealing cover 2b is removed from the pail 2 and a waste bag 9 is set in the pail 2. Thereafter, the seat structure 1 is placed on the pail 2. The inner hanging portion 3b of the base 3 is positioned in the pail 2. Thus, the seat structure 1 is detachably mounted to the pail 2 by means of an attachment. The attachment may be screws 3e provided on the outer hanging portion 3c and to be screwed in the vicinity of the flange 2a at the opening of the pail 2. Alternatively, the attachment may be magnets 3f attracting at the opening of the pail 2.

Figure 23:
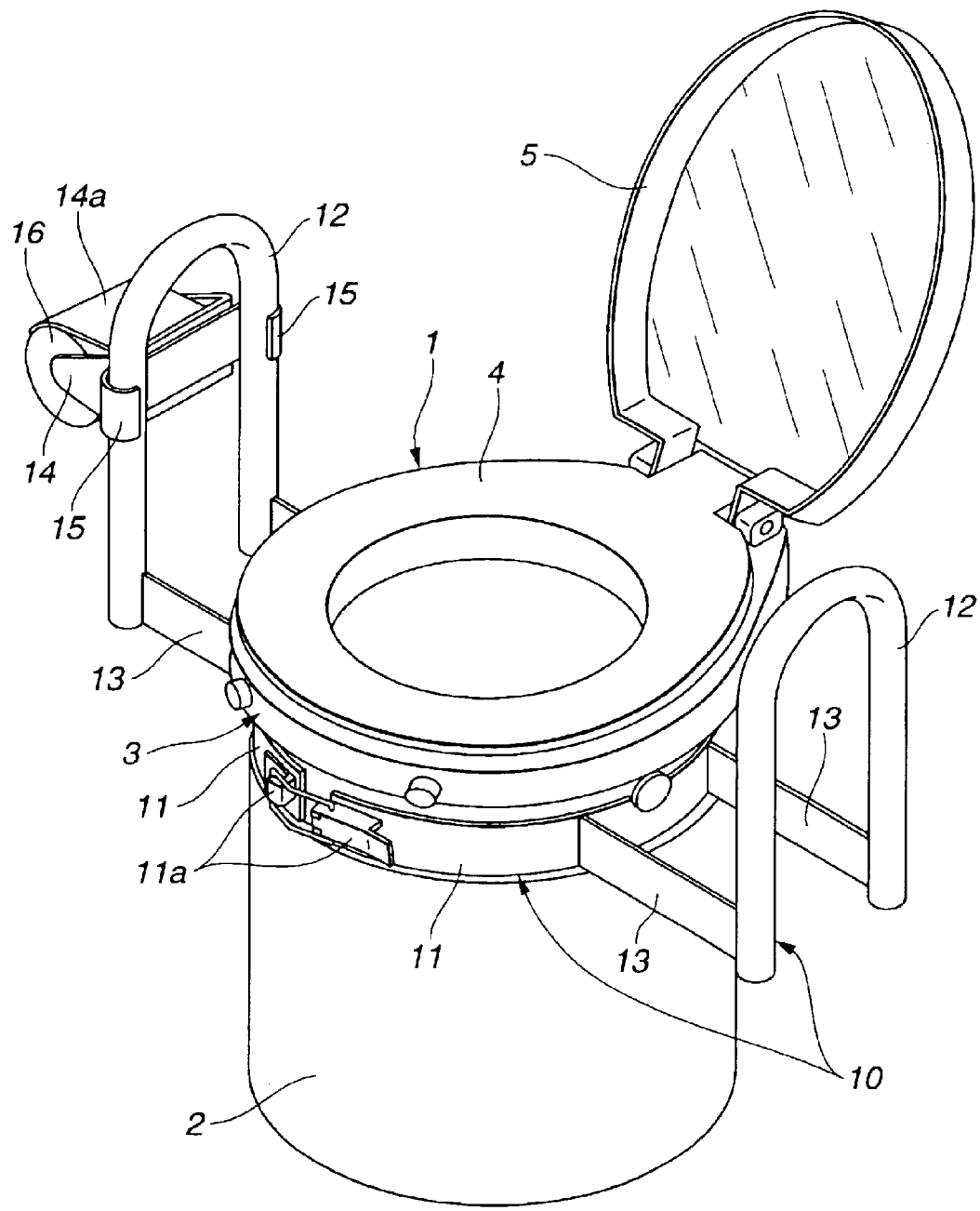
FIG. 23 is a perspective view illustrating a portable toilet, which has hand grips attached to a pail and which has a toilet paper holder fitted to a hand grip.
Figure 24:
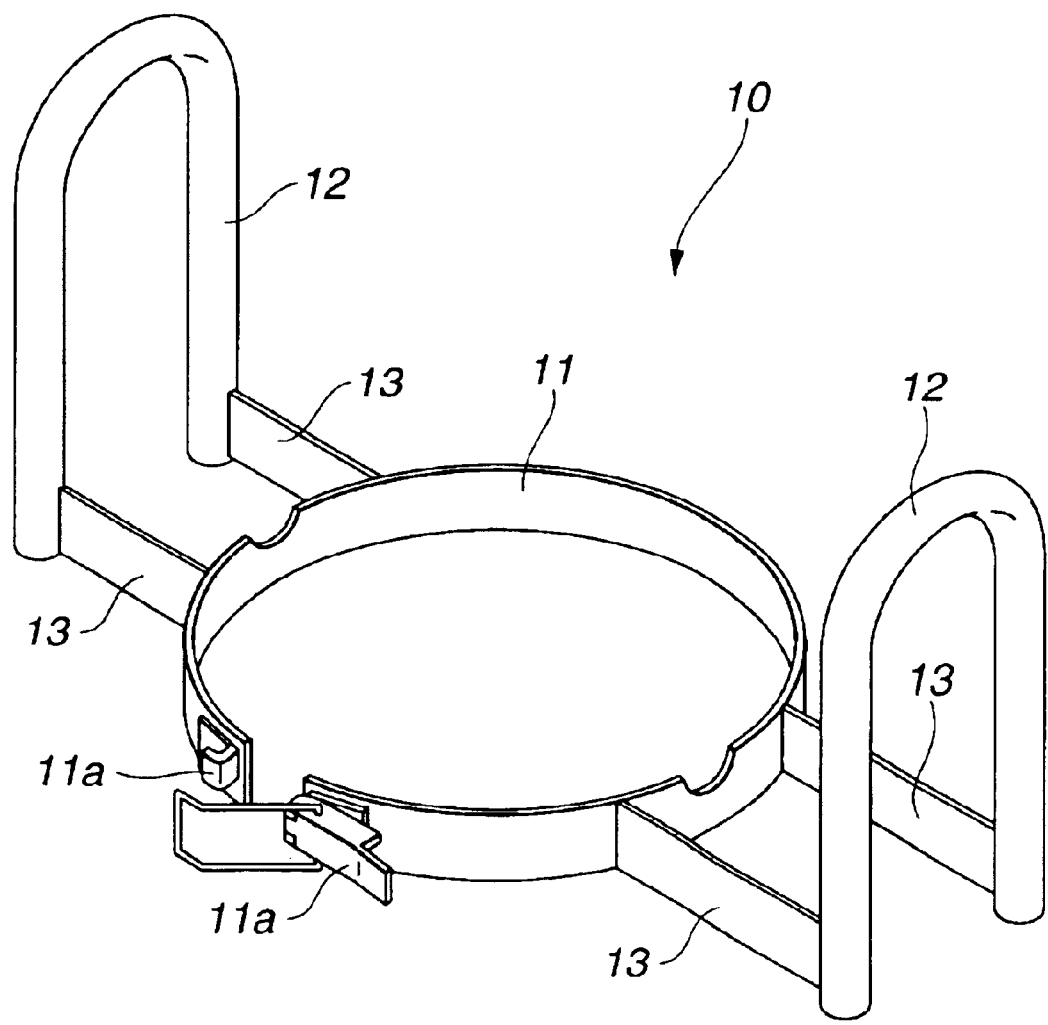
FIG. 24 is a perspective view illustrating hand grips according to an embodiment.

A hand grip for a portable toilet, according to the third embodiment of the present invention, will be explained below (FIGS. 23 and 24).

A portable toilet includes a pail 2 and a seat structure 1 detachably attached at the opening of the pail 2. The seat structure 1 is formed of a base 1a, a (toilet) seat 1b and a cover 1c.

The metal ring band 4 is detachably mounted around the pail 2 by means of the fastener 4a. Parallel metal stays 6, 6, which protrude rightward and leftward from the outer surface of the ring band 4, are securely fixed to the ring band 4. The lower ends of a U-shaped metal (hand-grip) pipe 5 are securely fixed to the ends of the parallel metal stays 6 to form a hand grip 10.

The ring band 4 of the hand grip 3 is wound and tightly fastened around the pail 2 by means of the fastener 4a. The hand grips 5, 5 stand upward from the right and left side of the pail 2. When the user sits down on or gets off the seat 1b, the user's body is supported with the hand grips 5, 5 gripped by both hands.

The fastener 4a of the ring band 4 is not limited to only the present embodiment. Existing fastener tools with equivalent functions, commercially available, may be used. For example, a conventional buckle fixture (as shown) may be used as the fastener 4a. The latch of a buckle attached to one end of the ring band 4 is engaged to a hook attached to the other end thereof to fasten the buckle with no rotation.

Figure 22:
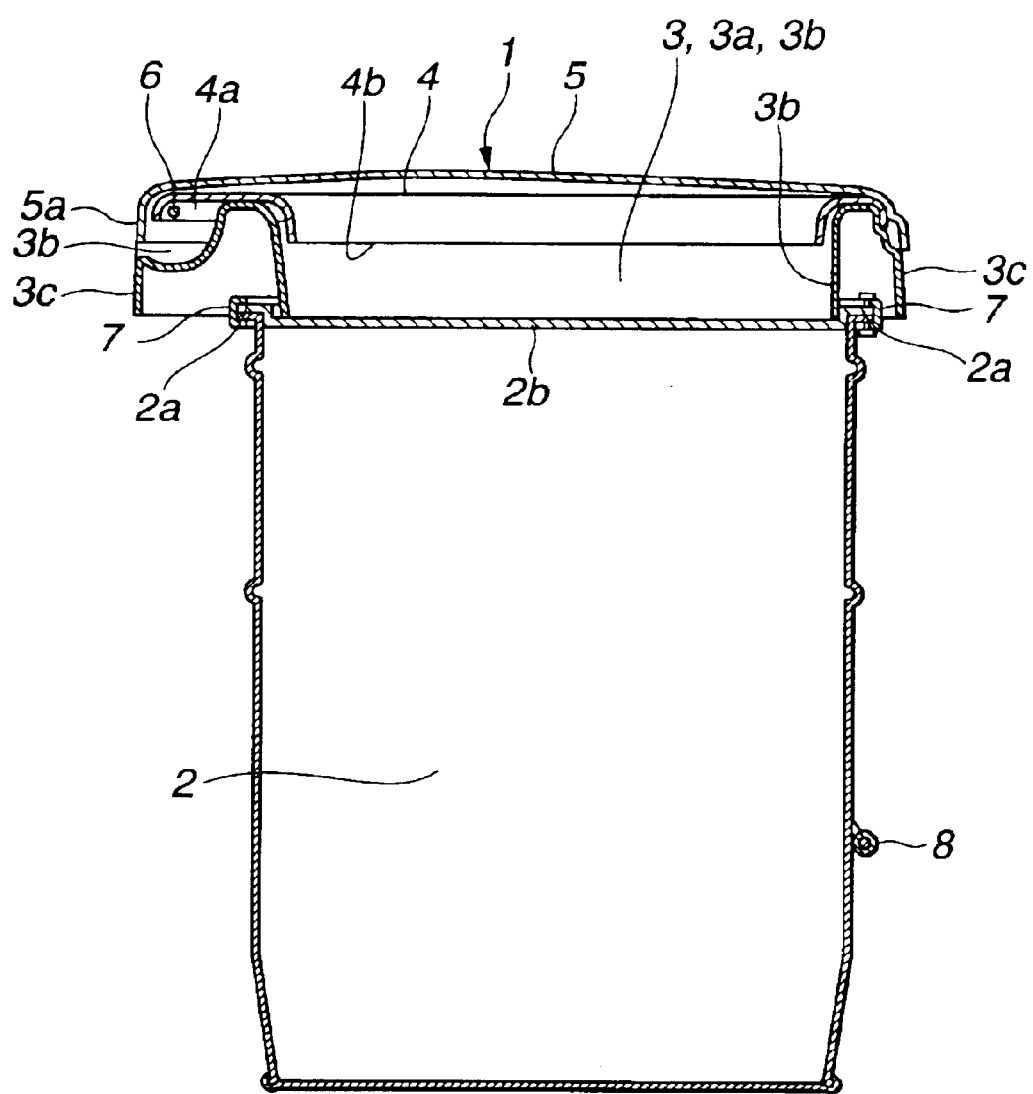
FIG. 22 is a cross-sectional view illustrating a seat structure placed on a pail sealed with a lid, corresponding to the fragmentary view taken along the line A—A of FIG. 1, corresponding to FIG. 7.
Figure 25:
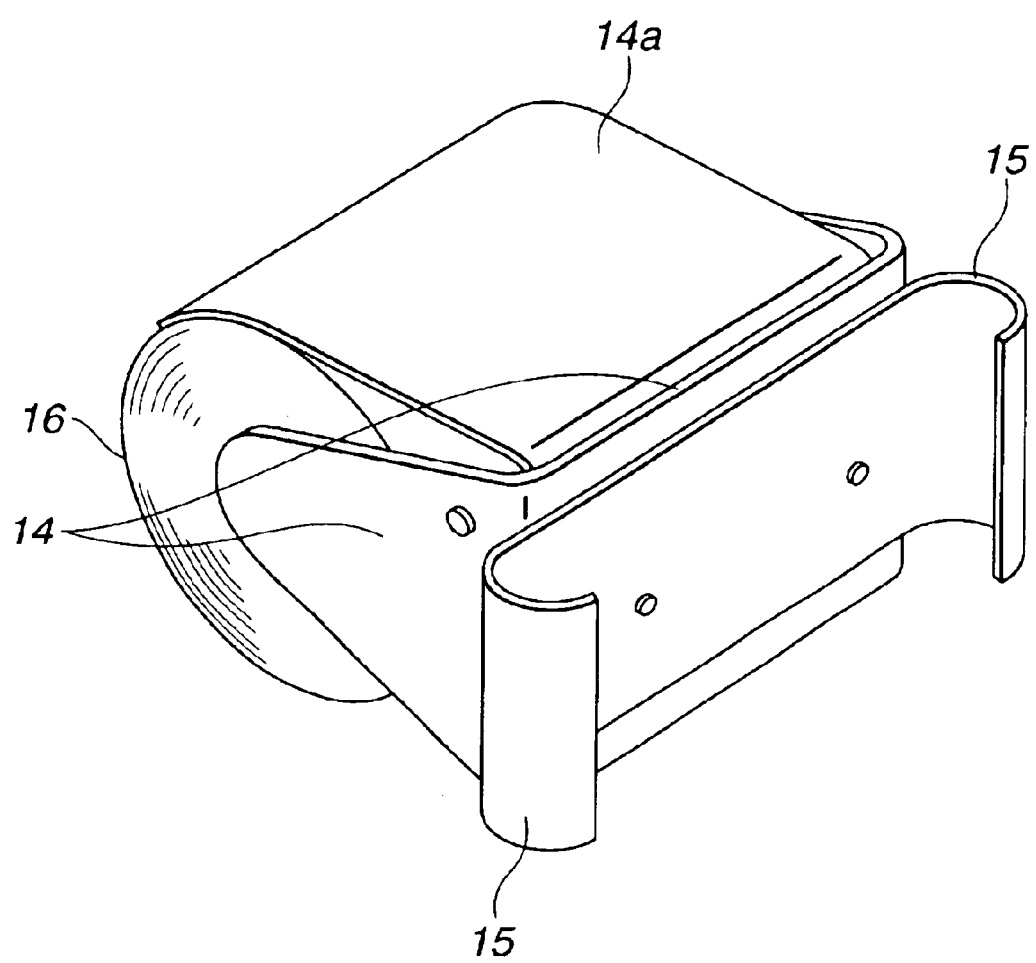
FIG. 25 is a perspective view illustrating a toilet paper holder according to an embodiment.

A toilet paper holder for a portable toilet using a pail, according to the fourth embodiment will be explained below by referring to FIGS. 22 and 25.

In order to attach a toilet paper roll 9 to the grip hand of the portable toilet, a toilet paper holder has a mounting portion. A conventional toilet paper holder 7 includes, for example, a back plate and a right side plate and a left side plate. A shaft through which a toilet paper roll 9 is inserted is disposed between the right and left side plates. The cover 7a covering upper surfaces of the toilet paper roll 9 is axially opened and closed around the shaft.

A mounting portion 8 which is inserted detachably and vertical-slidably to the right or left parallel pipe 5 of the hand grip 3 is provided on the back plate of the holder 7.

The mounting portion 8 is formed of a metal rectangular plate securely fixed to the rear plate. The rectangular plate has lips each formed by semi-circularly bending with the diameter of each pipe 5. Thus, the mounting portion 8 is fitted detachably and vertical-slidably to a parallel hand grip pipe 5.

The toilet paper holder is not limited only to the structure as shown. Arbitrary conventional toilet paper holders, commercially available, may be used for that embodiment by attaching the mounting portion to be fitted to the hand grip pipe, on the rear surface thereof.

In storage and conveyance, inside the pail 2 are appropriately stored necessaries including, for example, waste bags 9 (e.g. plastic bags) for reserving waste and urine for several times and urine several times, toilet paper rolls, detergent, disinfectant, deodorant, partition paper board between previous use and next use, portable tent, and related things. The metal sealing lid 2b is sealed with the ring band 7 (the pail 2 is formed of a container, a sealing lid 2, a ring band 7, and a handle 8). Thereafter, a set of the pail 2 and the seat structure placed thereon is kept or carried by lifting the handle 8.

The seat structure 1 and the occupied pail 2 or an unoccupied pail 2 may be separately stored and conveyed.

Because the pail 2 is suitable for conveyance or storage of wastes or others, it is desirable to prepare a large number of spare pails.

In preparation for the use of the portable toilet, the sealing lid 2b is first removed from the pail 2 and the items in the pail 2 are taken out. The waste bag 9 is set in the pail 2. The fringe of the opening of the waste bag 9 covers the fringe of the opening of the pail 2. The seat structure 1 is placed on the pail 2. The inner hanging portion 3b is inserted into the pail (into the waste bag 9). The seat structure 1 is detachably attached to the pail 2 with an attachment. The attachment may be the screws 3e provided to the outer hanging portion 3c positioned around the outer fringe of the opening of the pail 2, to be screwed in the vicinity of the flange 2a at the opening. Alternatively, the attachment may be the magnet 3f attracting at the opening of the pail 2.

In the use of the seat structure 1, the cover 5 is opened backward from the front at a predetermined angle with respect to the shaft 6 of the bracket 5a. Then, the user sits down on the seat 4 (in case of men and women). Alternately, both the cover 5 and the seat structure 4 are simultaneously opened at a predetermined angle (in case of men).

Every time the portable toilet is used for excrement, a partition paper board is covered on it. When the pail is filled with excrement, the seat structure 1 is removed from the pail 2 by loosing the screws 3e or removing off the magnets 3 against attraction. Then, the waste bag 9 containing excrement is taken out and discarded or treated for storage. A new waste bag 9 is set in the pail 2.

When the waste bag 9 containing wastes cannot be discarded on the spot, it is stored, for example, into another pail. Then, the waste bag 9 in the pail 2 is sealed with the sealing lid 2b and with the ring band 7. The sealed pail 2 is stored and conveyed.

The seat structure 1 and the pail 2 are removed from each other and then washed and exchanged.

Moreover, in the use, it is desirable to prepare a portable tent sheltering the portable toilet and its vicinities.

The ring band 4 connected to the hand grip 3 is wound around the pail 2. The ring band 4 is fastened to the pail 2 with the fastener 4a in such a way that the right and left hand grip pipes 5 and 5 are respectively positioned on the right and left sides.

The height of the hand grips 3 is adjusted by changing the position where the ring band 4 fastens the pail 2.

In contrast, when the fastener 4a of the ring band 4 is loosed, the hand grips 3 can be easily disassembled from the pail 2.

The attachment 8 on the back surface of the toilet paper holder 7 is inserted from the upper end of the right or left hand grip 5 (parallel pipes) of the hand grip 3.

With the paper holder 7 fitted to the hand grip pipe 5, the paper holder 7 is vertically slid along the parallel pipes to adjust the height thereof.

The paper holder 7 can be easily pulled out from the upper end of the grip pipe 5.

The pail excels as a container in characteristics including durability against shock by inner/outer pressures, watertightness, uniformity in dimensions, and unified standard. The seat with a unique configuration according to the present invention, which has an external appearance and user-friendliness, close to those of the seat of a daily familiar toilet, is detachably mounted to the pail. Hence, the portable toilet that has good operability and good durability and is convenient for storage and conveyance can be provided inexpensively and in mass volume.

The seat structure has a base detachably mounted to a pail, and a (toilet) seat and a cover, which are attached to the base in such a way that they can be opened and closed arbitrarily. Hence, the seat structure can realize good external appearance and operability, which are not largely different from those of the seat of a common toilet. Women can use the improved portable toilet without a sense of discomfort.

In the seat structure, the inner hanging portion of the base, formed to the inner diameter of a pail, fits to the pail so as to restrict two-dimensional movement. The seat structure has attachments, for example, screws provided to the outer hanging portion, corresponding positions on the peripheral surface at the opening of the pail, to screw portions in the vicinity of the flange, or strong magnets 3f. Thus, the base can be firmly attached or easily detached to/from the opening of the pail. Hence, because there is no danger that the seat structure assembled to the pail moves or disengages, the seat structure can be used safely and can be attached and detached easily.

To use the portable toilet (for men and women), the user opens the cover only and sits down on the seat structure. To use the portable toilet for urinal, the user opens both the cover and the seat. This allows the portable toilet to be selectively used in different modes, like the common toilet. This feature can provide good operability and can reduce the soiling of the seat in use.

When being not used, the pail, which has good sealing performance, can preserve toilet necessaries and foods for a long period of time, without changes in quality. The waste bag containing wastes cannot be treated in disasters or leisure activities, the pail is sealed with the lid and the ring band. This procedure can prevent bad smell from leaking out and a strong shock due to falling or dropping from causing the leaking of contents. Hence, the pail can be held, stored, and conveyed safely.

Standardized pails are being mass-produced and distributed and a vast amount of used pails are being discharged. Thus, the pails are in a mass supply state at all times. The seat structure, which can be easily mass-produced as a plastic molding article, is most suitable for disasters and overseas aid.

Moreover, the pails are convenient for leisure activities and others. Preparing one pail in each home is useful.

The seat structure and the pail can be easily assembled and disassembled, they can be differently washed and exchanged easily.

It is most preferable to store a set of the seat structure and a pail (holding necessities). Because such a set of components is bulky, they may be differently stored or only the seat structure may be prepared. Thus, each component becomes serviceable in disaster.

A handle previously attached to each pail facilitates carrying.

The hand grip is a simple structure which has hand grip pipes integrally planted on the stays extending rightward and leftward from a metal ring band detachably mounted to a pail. Hence, strong hand grips can be manufactured easily and inexpensively.

Because the metal ring band is detachably wound around the pail by means of a fastener, the height of the hand grip can be adjusted and installed safely and rigidly. Hand grip pipes are erected on the right and left sides of the seat structure placed on the pail. Hence, when user sits down on or gets off the seat, the user's body can be supported with the hand grip pipes.

Moreover, by fitting the attachment attached on the rear plate of the toilet paper holder along the hand grip pipes, the holder can be easily attached vertically and adjustably on the hand grip pipes. Hence, the user can prepare a toilet paper roll to the nearby hand grip pipes.

What is claimed is:

1. A portable toilet comprising a seat structure and a pail, said seat structure being disposed on the pail and detachably attached in the vicinity of a flange at the opening of said pail and by means of screws provided on a front side of said seat or magnets mounted at an inner surface of the seat structure, said pail in which a waste bag is set;

said seat structure including a base, a seat, and a cover;

said base being a circular or oval plate having a center hole, said base having an inner hanging portion extending downward from edges of said hole, an outer hanging portion extending downward from outer periphery, detachable means, and a bracket bearing protruding at the upper end of said base and rotatably attaching a bracket of said seat and a bracket of said cover on a shaft, said waste bag being detachably sandwiched between the base and the pail;

said seat being a circular or oval plate having a center hole and a bracket, said seat being disposed on said base, said bracket protruding at the rear end, said bracket being rotatably attached to a bracket bearing of said base by means of a shaft to open and close said seat; and said cover being a circular or oval plate which has a center recess to cover the upper surface of said seat, said cover having a rear end from which a bracket protrudes, said bracket being rotatably attached to a bracket bearing of said base by means of a shaft to open and close said cover.

2. A seat structure for a portable toilet, comprising a seat structure, said seat structure including a base, a seat and a cover;

said base being a circular or oval plate having a center hole, said base having an inner hanging portion extending downward from edges of said hole, an outer hanging portion extending downward outer periphery, detachable means, and a bracket bearing protruding at the upper end of said base and rotatably attaching a bracket of said seat and a bracket of said cover on a shaft;

said seat being a circular or oval plate having a center hole and a bracket, said seat being disposed on said base, said bracket protruding at the rear end, said bracket being rotatably attached to a bracket bearing of said base by means of a shaft to open and close said seat;

said cover being a circular or oval plate which has a center recess to cover the upper surface of said seat, said cover having a rear end from which a bracket protrudes, said bracket being rotatably attached to a bracket bearing of said base by means of a shaft to open and close said cover; and said seat structure being disposed on a pail, said inner hanging portion of said base being positioned in said pail, said seat structure being detachably mounted to said pail by means of screws provided on a front side of said seat or magnets mounted at an inner surface of the base, wherein a waste bag is set in the pail and detachably sandwiched between the base and the pail.

\* \* \* \* \*